(12) United States Patent
Rogers et al.

(10) Patent No.: US 8,000,945 B2
(45) Date of Patent: Aug. 16, 2011

(54) METHOD FOR DETERMINING HETEROGENEOUS BOTTOM FRICTION DISTRIBUTIONS USING A NUMERICAL WAVE MODEL

(75) Inventors: William Erick Rogers, Carriere, MS (US); Timothy Ray Keen, Slidell, LA (US); Kenneth Todd Holland, Diamondhead, MS (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 448 days.

(21) Appl. No.: 12/188,400

(22) Filed: Aug. 8, 2008

(65) Prior Publication Data

US 2010/0036650 A1     Feb. 11, 2010

(51) Int. Cl.
*G06G 7/56* (2006.01)
(52) U.S. Cl. ............ 703/5; 703/2; 703/6; 703/9; 703/10
(58) Field of Classification Search .................. 703/2, 5, 703/6, 9, 10
See application file for complete search history.

(56) References Cited

OTHER PUBLICATIONS

Keen et al. "Determining Heterogeneous Bottom Friction Distributions Using a Numerical Wave Model." 2007.*
Anderson, D. L. T., J. Sheinbaum, and K. Haines (1996), Data assimilation in ocean models, Rep. Prog. Phys., 59, 1209-1266.
Anthony, E. J., A. Gardel, F. Dolique, and D. Guiral (2002), Short-term changes in the plan shape of a sandy beach in response to sheltering by a nearshore mud bank, Cayenne, French Guiana, Earth Surf. Processes Landforms, 27, 857-866.
Ardhuin, F., W. C. O'Reilly, T. H. C. Herbers, and P. F. Jessen (2003), Swell transformation across the continental shelf. Part I: Attenuation and directional broadening, J. Phys. Oceanogr., 33, 1921-1939.
Beck, M. B. (1987), Water-quality modeling: A review of the analysis of uncertainty, Water Resour. Res., 23, 1393-1442.
Bertino, L., G. Evensen, and H. Wackernagel (2003), Sequential data assimilation techniques in oceanography, Int. Stat. Rev., 71, 223-241.
Bidlot, J. R., and M. W. Holt (1999), Numerical wave modeling at operational weather centres, Coastal Eng., 37, 409-429.
Booij, N., R. C. Ris, and L. H. Holthuijsen (1999), A third-generation wave model for coastal regions: 1. Model description and validation, J. Geophys. Res., 104, 7649-7666.
Dalrymple, R. A., A. B. Kennedy, J. T. Kirby, and Q. Chen (1998), Determining Depth from remotely sensed images, in Coastal Engineering 1998, edited by B. Edge, pp. 2395-2408, Am. Soc. of Civ. Eng., Reston, Va.
Elgar, S., R. T. Guza, B. Raubenheimer, T. H. C. Herbers, and E. L. Gallagher (1997), Spectral evolution of shoaling and breaking waves on a barred beach, J. Geophys. Res., 102, 15,797-15,805.

(Continued)

*Primary Examiner* — Kamini S Shah
*Assistant Examiner* — Saif A Alhija
(74) *Attorney, Agent, or Firm* — Amy I. Ressing; Kathleen Chapman

(57) ABSTRACT

A computer-implemented inversion method for determining characteristics of a bottom roughness field using a numerical wave model is provided. Measured wave heights over an area of interest are compared to predicted wave heights calculated by a wave model using an estimated bottom roughness parameter. If the error between the measured wave heights and the predicted wave heights is within a specified tolerance level, the analysis ends and the value of the bottom roughness parameter used in the wave model is retrieved. If the error is not within the specified tolerance level, an Influence Matrix IM is used to obtain a revised estimated bottom roughness parameter. The wave model is re-run using the revised roughness parameter and the resulting predicted wave heights are compared to the measured wave heights. The inversion continues until the wave height error is within the specified tolerance level. When the inversion ends, the bottom roughness field that produced those predicted wave heights is retrieved.

18 Claims, 30 Drawing Sheets

Case 1 - Baseline Model
Bathymetry

OTHER PUBLICATIONS

Greenslade, D. J. M. (2001), The assimilation of ERS-2 significant wave height data in the Australian region, J. Mar. Syst., 28, 141-160.

Grilli, S. T. (1998), Depth inversion in shallow water based on non-linear properties of shoaling periodic waves, J. Coastal Eng., 35, 185-209.

Gurgel, K. W., G. Antonischki, H. H. Essen, and T. Schlick (1999), Wellen Radar (WERA): A new ground-wave HF radar for ocean remote sensing, Coastal Eng., 37, 219-234.

Haus, B. K. (2007), Surface current effects on the fetch-limited growth of wave energy, J. Geophys. Res., 112, C03003, doi:10.1029/2006JC003924.

Holland, K. T. (2001), Application of the linear dispersion relation with respect to depth inversion and remotely sensed imagery, IEEE Trans. Geosci. Remote Sens., 39, 2060-2072.

Holthuijsen, L. H., N. Booij, M. vanEndt, S. Caires, and C. G. Soares (1997), Assimilation of buoy and satellite data in wave forecasts with integral control variables, J. Mar. Syst., 13, 21-31.

Kaihatu, J. M., and A. Sheremet (2004), Dissipation of wave energy by cohesive sediments, in Coastal Engineering 2004, edited by J. M. Smith, pp. 498-507, World Sci., Hackensack, N. J.

Keen, T. R., G. Stone, J. M. Kaihatu, and Y. L. Hsu (2003), Barrier island erosion during a winter cold front in Mississippi Sound, in CoastalSediments 2003 [CD-ROM], edited by R. A. Davis, A. H. Sallenger Jr., and P. Howd, 13 pp., World Sci., Hackensack, N. J.

Kennedy, A. B., R. A. Dalrymple, J. T. Kirby, and Q. Chen (2000), Determination of inverse depths using direct Boussinesq modeling, J. Waterw. Port Coastal Ocean Eng., 126, 206-214.

Le Dimet, F. X., and O. Talagrand (1986), Variational algorithms for analysis and assimilation of meteorological observations: Theoretical aspects, Tellus, Ser. A, 38, 97-110.

Madsen, O. S., Y. K. Poon, and H. C. Graber (1988), Spectral wave attenuation by bottom friction: Theory, Coastal Engineering [1988], edited by B. L. Edge, pp. 492-504, Am. Soc. of Civ Eng., Reston, Va.

Mastenbroek, C., and C. F. de Valk (2000), A semiparametric algorithm to retrieve ocean wave spectra from synthetic aperture radar, J. Geophys. Res., 105, 3497-3516.

McBride, R. A., and T. F. Moslow (1991), Origin, evolution, and distribution of shoreface sand ridges, Atlantic inner shelf, U.S.A., Mar. Geol., 97, 57-85.

Narayanan, C., V. N. R. Rao, and J. M. Kaihatu (2004), Model parameterization and experimental design issues in nearshore bathymetry inversion, J. Geophys. Res., 109, C08006, doi:10.1029/2002JC001756.

O'Reilly, W. C., and R. T. Guza (1998), Assimilating coastal wave observations in regional swell predictions. Part I: Inverse methods, J. Phys. Oceanogr., 28, 679-691.

Sheremet, A., and G. W. Stone (2003), Observations of nearshore wave dissipation over muddy sea beds, J. Geophys. Res., 108(C11), 3357, doi:10.1029/2003JC001885.

Sun, N. Z., M. Elimelech, and J. N. Ryan (2001), Sensitivity analysis and parameter identifiability for colloid transport in geochemically heterogeneous porous media, Water Resour. Res., 37, 209-222.

Wackerman, C., D. Lyzenga, E. Ericson, and D. Walker (1998), Estimating near-shore bathymetry using SAR, in Proceedings of the 1998 International Geoscience and Remote Sensing Symposium_ Sensing and Managing the Environment, edited by T. I. Stein, pp. 1668-1670, Inst. Of Electr. and Electr. Eng., New York.

Weisse, R., and F. Feser (2003), Evaluation of a method to reduce uncertainty in wind hindcasts performed with regional atmospheric models, Coastal Eng., 48, 211-225.

Feddersen, F., E. L. Gallagher, R. T. Guza, and S. Elgar (2003), The drag coefficient, bottom roughness, and wavebreaking in the nearshore, Coastal Eng., 48, 189-195.

Falk Feddersen (2003), Observations of nearshore circulation. Alongshore uniformity, Journal of Geophysical Research, vol. 108, No. C1, 3006, doi:10.1029/2001JC001293.

* cited by examiner

METHOD FOR DETERMINING HETEROGENEOUS BOTTOM FRICTION DISTRIBUTIONS USING A NUMERICAL WAVE MODEL

TECHNICAL FIELD

The present invention relates to a method for estimating spatially variable bottom roughness lengths in coastal regions using a numerical wave model.

BACKGROUND

Ocean dynamics can affect many aspects of operations near the coastline. In military operations, for example, operation of small craft and Unmanned Undersea Vehicles can be significantly affected by the dynamics of the ocean or other bodies of water near the coastline. In conventional civilian applications, such coastal dynamics can also play an important part in activities such as planning and operation of recreation facilities, fishing (both recreational and commercial), and coastal engineering projects.

Among the geological features that affect ocean dynamics near the coastline are the bottom type (friction features) and bathymetry of the ocean floor. The friction features, which are on the order of 100 km$^2$ in area, represent variations in bottom characteristics such as bed forms and sediment type. The spatial scale of sediment heterogeneity varies, but mud banks can be as much as 1800 km$^2$ in extent whereas individual ripples are much smaller. See E. J. Anthony, A. Gardel, F. Dolique, and D. Guiral (2002), "Short-term changes in the plan shape of a sandy beach in response to sheltering by a nearshore mud bank, Cayenne, French Guiana," *Earth Surf. Processes Landforms*, 27, 857-866. Bathymetric features include depressions such as drowned river valleys and elevated areas such as shoals and sand ridges. See R. A. McBride and T. F. Moslow (1991), "Origin, evolution, and distribution of shoreface sand ridges, Atlantic inner shelf, U.S.A.," *Mar. Geol.*, 97, 57-85.

Although it is not possible to completely observe the global ocean, remote sensing has made it easier to measure sea surface properties over large regions. Satellites and coastal radar have provided dense data sets that can be used to analyze wave motion and other aspects of ocean and coastal dynamics. See, for example, Haus, B. K. (2007), "Surface current effects on the fetch-limited growth of wave energy," *J. Geophys. Res.*, 112, C03003, doi:10.1029/2006JC003924. Synthetic Aperture Radar (SAR) data can be processed to retrieve wave heights but can have high error rates, in some cases as much as 29%. See C. Mastenbroek and C. F. de Valk (2000), "A semiparametric algorithm to retrieve ocean wave spectra from synthetic aperture radar," *J. Geophys. Res.*, 105, 3497-3516. Shore-based radar systems such as those described in by Gurgel et al. could also be useful for providing wave measurements. K. W. Gurgel, G. Antonischki, H. H. Essen, and T. Schlick (1999), "Wellen Radar (WERA): A new ground-wave HF radar for ocean remote sensing," *Coastal Eng.*, 37, 219-234. These approaches have problems but their continued development suggests that dense wave height observations with errors less than 10% are not an unreasonable expectation in the future.

However, observation of the seafloor is more problematic. Key aspects of the seafloor that can be very important to determine are the shape, size, and makeup of bottom friction fields. Although bottom friction is not critical to understanding the dynamics of ocean currents in deep water, it can be an important factor affecting both currents and waves in the shallow water over the continental shelf. Moreover, the ability to isolate bottom friction errors from water depth errors is crucial to evaluate bottom sediment type using wave observations.

When the water depth is less than the deep-water wavelength of wind-generated surface waves, bottom friction can produce observable changes in the surface wave properties, for example, by dissipating wave energy as waves propagate over the fields. Research on wave dynamics affected by friction fields has been carried out by many researchers. See, for example, A. Sheremet and G. W. Stone (2003), "Observations of nearshore wave dissipation over muddy sea beds," *J. Geophys. Res.*, 108(C11), 3357; F. Ardhuin, W. C. O'Reilly, T. H. C. Herbers, and P. F. Jessen (2003), "Swell transformation across the continental shelf. Part I: Attenuation and directional broadening," *J. Phys. Oceanogr.*, 33, 1921-1939; and J. M. Kaihatu and A. Sheremet (2004), "Dissipation of wave energy by cohesive sediments," in *Coastal Engineering* 2004, edited by J. M. Smith, pp. 498-507.

The changes in ocean surface properties due to bottom friction fields can be observed remotely, as can other ocean surface properties like wave energy spectra and temperature. However, when only surface properties are available, it may be difficult to determine the causes of the observed changes. Consequently, ocean scientists have begun to utilize inverse techniques, which can improve our knowledge of physical processes from observations.

One kind of inverse method is data assimilation, which combines model physics with observations to provide a better picture of the ocean than can be deduced from either form of analysis alone. See D. L. T. Anderson, J. Sheinbaum, and K. Haines (1996), "Data assimilation in ocean models," *Rep. Prog. Phys.*, 59, 1209-1266.

Data assimilation techniques can take many forms, and range from nudging numerical models with observations to direct assimilation of observations using variational approaches. See F. X. Le Dimet and O. Talagrand (1986), "Variational algorithms for analysis and assimilation of meteorological observations: theoretical aspects," *Tellus, Ser. A*, 38, 97-110; A. F. Bennett (1992), *Inverse Methods in Physical Oceanography*, 346 pp.; and L. Bertino, G. Evensen, and H. Wackernagel (2003), "Sequential data assimilation techniques in oceanography," *Int. Stat. Rev.*, 71, 223-241.

In the oceanographic field, data assimilation has been used to improve numerical wave forecasts by nudging wave models with observations from wave buoys and remote sensing. See W. C. O'Reilly and R. T. Guza (1998), "Assimilating coastal wave observations in regional swell predictions. Part I: Inverse methods," *J. Phys. Oceanogr.*, 28, 679-691; L. H. Holthuijsen, N. Booij, M. vanEndt, S. Caires, and C. G. Soares (1997), "Assimilation of buoy and satellite data in wave forecasts with integral control variables," *J. Mar. Syst.*, 13, 21-31; J. R. Bidlot and M. W. Holt (1999), "Numerical wave modeling at operational weather centres," *Coastal Eng.*, 37, 409-429; and D. J. M. Greenslade (2001), "The assimilation of ERS-2 significant wave height data in the Australian region," *J. Mar. Syst.*, 28, 141-160.

In addition to its use in improving wave forecasting, data assimilation has also proven useful in estimating water depth using inverse techniques. See R. A, Dalrymple, A. B. Kennedy, J. T. Kirby, and Q. Chen (1998), "Determining bathymetry from remotely sensed images," *Coastal Engineering* 1998, edited by B. Edge, pp. 2395-2408; S. T. Grilli (1998), "Depth inversion in shallow water based on nonlinear properties of shoaling periodic waves," *J. Coastal Eng.*, 35, 185-209; and C. Wackerman, D. Lyzenga, E. Ericson, and D. Walker (1998), "Estimating near-shore bathymetry using SAR," in *Proceedings of the 1998 International Geoscience and Remote Sensing Symposium: Sensing and Managing the Environment*, edited by T. I. Stein, pp. 1668-1670, Inst. Of Electr. and Electr. Eng., New York. Iterative approaches are necessary for depth inversions based on numerical wave modeling. See A. B. Kennedy, R. A. Dalrymple, J. T. Kirby, and Q. Chen (2000), "Determination of inverse depths using direct Boussinesq modeling," *J. Waterw. Port Coastal Ocean Eng.*, 126, 206-214. It also may be possible to perform joint inversions for bottom friction and bathymetry, see K. T. Holland (2001), "Application of the linear dispersion relation with respect to depth inversion and remotely sensed imagery," *IEEE Trans. Geosci. Remote Sens.*, 39, 2060-2072.

Data assimilation requires that some assumptions be made with respect to the relationships between the data and model parameters being investigated. Numerical wave models that include physical phenomena such as shoaling, dissipation, bottom friction and refraction can permit a comprehensive examination of complex processes.

However, in order to use a numerical wave model in an inverse solution, it is necessary to first identify the key model parameters. Key model parameters are those upon which all other parameters have a high dependency. They can be identified by sensitivity analyses using a numerical model. See N. Z. Sun, M. Elimelech, and J. N. Ryan (2001), "Sensitivity analysis and parameter identifiability for colloid transport in geochemically heterogeneous porous media," *Water Resour. Res.*, 37, 209-222; and R. Weisse and F. Feser (2003), "Evaluation of a method to reduce uncertainty in wind hindcasts performed with regional atmospheric models," *Coastal Eng.*, 48, 211-225. However, if a complex model is used, it is important to test for consistency in the selection of key parameters. See M. B. Beck (1987), "Water-quality modeling: A review of the analysis of uncertainty," *Water Resour. Res.*, 23, 1393-1442; and F. Feddersen, E. L. Gallagher, R. T. Guza, and S. Elgar (2003), "The drag coefficient, bottom roughness, and wave-breaking in the nearshore," *Coastal Eng.*, 48, 189-195.

Numerical wave models have previously been used in an iterative procedure to study the bottom friction field. See, for example, A. B. Kennedy, R. A. Dalrymple, J. T. Kirby, and Q. Chen (2000), "Determination of inverse depths using direct Boussinesq modeling," *J. Waterw. Port Coastal Ocean Eng.*, 126, 206-214; Narayanan, C., V. N. R. Rao, and J. M. Kaihatu (2004), "Model parameterization and experimental design issues in nearshore bathymetry inversion," *J. Geophys. Res.*, 109, C08006, doi:10.1029/2002JC001756, which uses observations of wave speed to make local corrections to the bathymetry.

SUMMARY

This summary is intended to introduce, in simplified form, a selection of concepts that are further described in the Detailed Description. This summary is not intended to identify key or essential features of the claimed subject matter nor is it intended to be used as an aid in determining the scope of the claimed subject matter.

A method is provided for estimating spatially variable bottom roughness fields in coastal regions where the roughness fields have a range of bottom roughness parameters $k_b$ over the field. The method is particularly applicable in friction-dominated coastal regions where dense measurements of wave height are available.

The method uses inputs of wave height measurements for a region of interest. The region of interest is divided into a grid, with each node in the grid being represented by an (i, j) coordinate. A numerical wave model is used to calculate a baseline predicted wavefield based on a control estimate of the bottom roughness parameter $k_b$ for the entire region of interest. The wave heights of the predicted wavefield are compared to the measured wave heights at each node in the grid to obtain a wave height error between the measured wave height and the predicted wavefield at each node in the grid. The resulting wave height error at each node is used in combination with an influence matrix to obtain a corrected estimated bottom roughness field having a corrected value of $k_b$ at each node. The corrected values of $k_b$ are then input into the wave model to compute a corrected predicted wavefield. This prediction-correction calculation is successively applied in a series of analysis cycles until the maximum wave height error for a cycle reaches a predetermined tolerance level. At that point the analysis ends and the bottom friction field corresponding to the measured wave field is retrieved.

DETAILED DESCRIPTION

Figure 1:
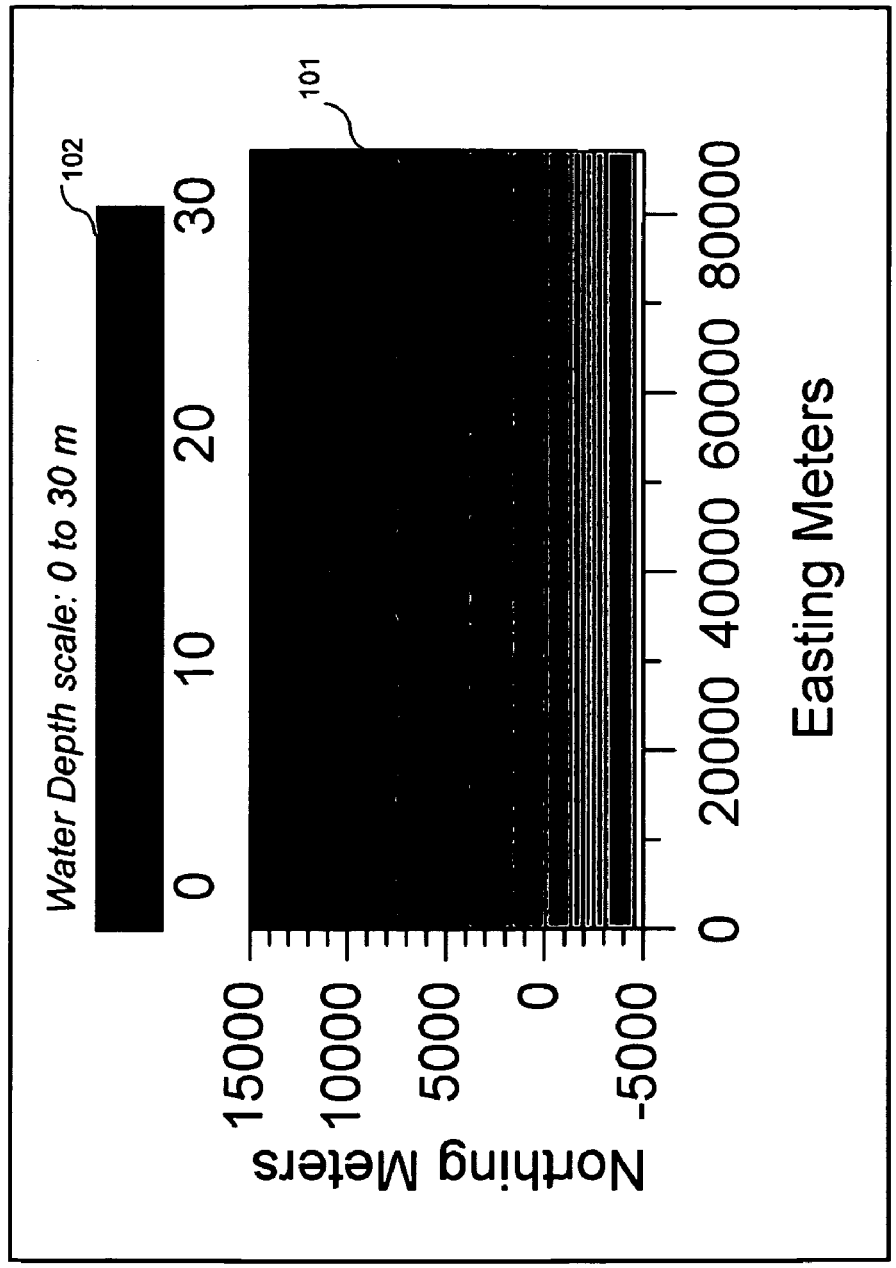
FIG. 1 depicts a plot of an exemplary baseline model bathymetry used in the inversion method of the present invention.

The aspects summarized above can be embodied in various forms. The following description shows, by way of illustration, combinations and configurations in which the aspects can be practiced. It is understood that the described aspects and/or embodiments are merely examples. It is also understood that one skilled in the art may utilize other aspects and/or embodiments or make structural and functional modifications without departing from the scope of the present disclosure.

For example, it should be noted that although the method for retrieving the bottom roughness parameter $k_b$ for an area of interest is described herein using a control case simulated wavefield as the initial input of the wave height measurements, the inversion method described herein can especially be used to retrieve the bottom roughness parameter $k_b$ using actual wave height data such as that obtained by direct observation or from remote sensing. In addition, although the present invention is described in terms of ocean dynamics, it would be apparent to one skilled in the art that the methods described herein can be applied with equal facility to coastal dynamics for other bodies of water, such as lakes and rivers, and that such applications are within the scope of the present invention.

The present invention provides a method for retrieving information regarding a bottom roughness field having a bottom roughness parameter $k_b$ using a wave model and an inversion method in a coastal area for which the bathymetry is known. The technique described herein permits the retrieval of this information about the bottom using the physics of energy dissipation caused by bottom friction.

Any numerical wave model can be used so long as it contains the key parameter of interest and so long as it satisfies the following conditions: (1) the equations used in the model capture the physical relationship between bottom friction and the wavefield, i.e., the nonlinear damping of wave energy caused by bottom roughness; (2) the equations used in the model have a dense set of observations as inputs; and (3) the solution to the equations is unique for a selected key parameter. One key parameter in numerical wave models for shallow water studies is water depth. Another second key parameter in such studies is bottom roughness, which contributes to bottom friction and wave dissipation in shallow water.

To provide an accurate determination of the bottom roughness, the numerical wave model must include a bottom-friction dissipation term in the model equations that explicitly represents the nonlinear damping of wave energy caused by bottom roughness. The SWAN wave model described in the present disclosure satisfies this condition because it includes a wave friction factor $f_w$ described below. The SWAN wave model also produces a database that represents a dense set of observations, and thus also satisfies the second condition noted above. Finally, it will be shown that the inversion method of the present invention works for small bathymetric errors because the influence of water depth on the wavefield is different from that of bottom friction.

As noted above, one wave model that can be used in the method of the present invention is the Simulating Waves Nearshore (SWAN) model, which includes terms for refraction, reflection caused by currents and water depth, wave breaking, dissipation by bottom friction and whitecapping, wave-wave interaction, and local wind generation.

The SWAN wave model represents surface waves with the two-dimensional wave action density spectrum $N(\sigma, \theta)$, where $\sigma$ is the relative frequency and $\theta$ is the wave direction. See N. Booij, R. C. Ris, and L. H. Holthuijsen (1999), "A third-generation wave model for coastal regions: 1. Model description and validation," *J. Geophys. Res.*, 104, 7649-7666. The wave spectrum is described by the spectral action balance equation:

$$\frac{\partial N}{\partial t} + \nabla \cdot \vec{C} N = \frac{S}{\sigma} \tag{1}$$

where: $\nabla$=the gradient operator in x, y, $\theta$, and $\sigma$; $\vec{C}$=the group velocity; and the source term S is given by $S=S_{bf}+S_{other}$.

The $S_{other}$ term is discussed in the Booj et al. publication and is not discussed herein as it is not relevant to the present disclosure. The bottom friction term $S_{bf}$ is defined by the equation:

$$S_{bf}(\sigma, \theta) = -C_{bf} \frac{\sigma^2}{g^2 \sinh^2(kd)} E_D(\sigma, \theta) \tag{2}$$

where: g=the gravity constant; k=wave number; d=water depth; and $E_D$=the energy density.

The drag coefficient $C_{bf}$ used in equation (2) is given by the relation $$C_{bf} = f_w \frac{g}{\sqrt{2}} U_{rms},$$

where $U_{rms}$ is a bottom orbital velocity. The wave friction factor $f_w$ used to determine the drag coefficient $C_{bf}$ is found by solving the following equation:

$$\frac{1}{4\sqrt{f_w}} + \log_{10}\left[\frac{1}{4\sqrt{f_w}}\right] = 0.08 + \log_{10}\left[\frac{a_b}{k_b}\right] \tag{3}$$

This wave model is used with the inversion method of the present invention to retrieve the bottom roughness parameter $k_b$. The influence of $k_b$ on the wave spectrum obtained from equation (1) is different from the influence of the water depth because it appears in the drag coefficient. Thus, by observing characteristics of the wave spectrum, such as wave height as is used in the present disclosure, the roughness parameter $k_b$ influencing that wave spectrum can be determined and thereby provide information regarding the properties of the coastal floor. It should be noted, however, that the methods described herein are not limited to use of wave height measurements and can be used with other observations of wave characteristics affected by bottom roughness and that such use is within the scope of the present invention.

The bottom friction formulation used in the method of the present invention is the eddy viscosity model described in O. S. Madsen, Y. K. Poon, and H. C. Graber (1988), "Spectral wave attenuation by bottom friction: Theory, in Coastal Engineering" [1988], edited by B. L. Edge, pp. 492-504, Am. Soc. of Civ. Eng., Reston, Va., which is hereby incorporated by reference as to material essential to an understanding of the present invention. In the examples described below, three values of the bottom roughness parameter $k_b$ are used: 0.005 m, 0.05 m, and 0.07 m. Sensitivity tests with the wave climate used herein showed that for larger values of $k_b$, there is an effective cap on the bottom friction term for the Madsen formula. A roughness length $k_b$ of 0.05 m is used as the background value in all of the simulations because it is a typical height for ripples on the inner shelf.

A stretched coordinate grid is used for the prognostic wave calculations by SWAN and the wave fields are output on a uniformly spaced computational grid (hereinafter termed output grid or OG) using bilinear interpolation, which is incorporated within SWAN. The OG grid is representative of the remotely sensed or measured wave fields, and an exemplary grid used by the SWAN wave model is grid 101 shown in FIG. 1. A uniform output grid is more convenient for processing the wave height and wave height error fields. The use of different calculation and output grids introduces some interpolation errors, which are considered acceptable for the simple wave fields considered herein.

The output grid OG is divided into no cells along the x (easting) axis and mo cells along the y (northing) axis, and nodes $(i_o, j_o)$ on the grid are denoted $i_o$ and $j_o$ along the x and y axes, respectively. In this figure and in all other figures shown herein, the y axis represents the distance from the coastline, with the coastline being on the "north" side of the grid at the top of the figure, and the x axis extends along the coastline "eastward" (though the particular direction is not necessarily towards the east).

The wave height error analysis and model correction computations are performed on a curvilinear grid (hereinafter called the analysis grid or AG) that spans the output grid domain. In the method of the present invention, the analysis grid is identical to or comprises a subset of the output grid. In an exemplary embodiment, the analysis grid is created by using every third row and column from the output grid; thus, the number of cells in the OG is decreased by a factor of nine in the AG. Nodes $(i_a, j_a)$ in the analysis grid are denoted by $i_a$ and $j_a$ along the easting and northing axes, respectively. The reduction in the number of cells from the OG to the AG does not introduce interpolation error, although it can result in a loss of information on the AG.

The setup for SWAN is the same for all of the examples described herein except for the bottom roughness distribution and bathymetry. It should be noted that the setup described herein is of course merely exemplary and that other configurations of SWAN can also be used in the method of the present invention. In this exemplary embodiment, the output grid 101 shown in FIG. 1 extends 88 km along the x axis, with 176 columns having a uniform spacing of 500 m each, and extends 25 km perpendicular to the coast (axis) with 43 rows whose dimensions decrease from 1000 m at the seaward margin to 100 m at the coast, for a total of no×mo=7,568 cells. The output grid has a stretched y coordinate because wave damping is insignificant in deeper water and thus high resolution is unnecessary there. The resulting bottom gradient of $1.5 \times 10^{-3}$ is between that of the U. S. middle-Atlantic shelf (less than $1.1 \times 10^{-2}$) and that of the Gulf of Mexico (approximately $6 \times 10^{-4}$). Output grid 101 also shows the depth of the water at points away from the coast in accordance with water depth scale 102. A uniform grid with a cell size of 200 m (not shown) is used for output from SWAN. The analysis grid (not shown) comprises every third column (na=58) and every third row (na=14) of the output grid, for a total of na×ma=812 cells.

In the examples described herein, the open boundary forcing consists of a JONSWAP (Joint North Sea Wave Project) spectrum applied uniformly on the southern boundary with a peak enhancement factor of 3.3. The mean wave height is 1 m and the wave source direction is oriented 30° from shore-normal (coming from south-southeast). There is no smooth and realistic way to specify a lateral boundary condition for this grid orientation in SWAN. The western and eastern boundaries use no wave forcing, which means that the predicted results are invalid for distances along the shoreline greater than 60 km. A directional resolution of 5° is used. Depth-induced breaking is represented in the wave model and would not be a problem if it were included in both the control and inversion runs; however, it is turned off for the examples described herein because the spatial resolution of the grid (e.g. grid depths of 0.4 m, 1.4 m, and 2.6 m within the surf zone) is inadequate. White-capping, wind input, and nonlinear interactions are also turned off. These restrictions limit the model to simulation of swell conditions only and the computations are stationary. Based on a number of sensitivity cases, we chose to use three iterations to find the stationary wave field. This iterative solution is required by the implicit scheme used by SWAN and is not related to the inversion.

The examples described herein focus on a bottom-friction-dominated problem, which is reflected in the included model physics. This simplified model reduces the numerical problem to one with only one dominant physical process, wave damping by bottom friction. Thus, the key parameter is well known and problems of parameter identification are minimized. Both refraction and shoaling are included in the model and are expected to be represented accurately. In order to increase the signal-to-noise ratio in the experiments, winds and other coastal forcing fields are not included because they would increase environmental noise that is not explicitly addressed in this study. A background (i.e., regional) bottom roughness length is used to increase the speed of convergence to solution, but it is not required by the method. It is also assumed that the water depth is known for the cases examined herein.

As described in more detail below, there are two types of geological features used in the examples herein: friction features and bathymetric features. The friction features, which are on the order of 100 km² in area, represent variations in bottom characteristics such as bed forms and sediment type. As noted above, the spatial scale of sediment heterogeneity varies but mud banks can be as much as 1800 km² in extent, see Anthony et al. 2002, infra, whereas individual ripples are much smaller. The value of $k_b$ used for these features in the model represents spatial averages of ripple fields. The friction features are simplifications of these bottom types that use only binary friction values (e.g., $k_b$=0.07 m or $k_b$=0.005 m). This simple structure is unknown to the inverse method, which does not utilize information about the parameter distribution in its solution, and therefore, the inverse solutions comprise a range of $k_b$ values representing bottom roughness field having a relatively continuous distribution of roughness characteristics rather than simple binary values representing a bottom having a sharp delineation between one level of roughness and another. The bathymetric depressions represent features like drowned river valleys and the elevated areas, which have horizontal dimensions of less than 3000 m, represent shoals and sand ridges, see McBride and Moslow, 1991, infra.

The method of the present invention is described in the context of eight exemplary cases shown in Table 1 below.

TABLE 1

Boundary Conditions and Parameters Used for SWAN Runs

| Case | Shelf Gradient and Bathymetry | $k_b$ (m) | Wavefield[a] |
|---|---|---|---|
| 1[b] | 0.0015 | 0.05 m | OBC: $H_s$ = 1 m from SSE |
| 2 | 0.0015 | Background = 0.05 m and feature = 0.005 m | OBC: $H_s$ = 1 m from SSE |
| 3 | 0.0015 | Background = 0.05 m and feature = 0.07 m | OBC: $H_s$ = 1 m from SSE |
| 4 | 0.0015 | Background = 0.05 m and two features = 0.005 m | OBC: $H_s$ = 1 m from SSE |
| 5 | 0.0015 | Background = 0.05 m and feature = 0.005 m | Case 2 field with random error of ±0.03 m |
| 6 | 0.0015 | Background = 0.05 m and feature = 0.005 m | Case 2 field with random error of ±0.12 m |
| 7 | Background = 0.0015 with embayment | 0.05 m | OBC: $H_s$ = 1 m from SSE |
| 8 | Background = 0.0015 with shoals (0.5-2 m) | Background = 0.05 m and feature = 0.07 m | OBC: $H_s$ = 1 m from SSE |

[a]OBC: Open Boundary Condition
SSE: South-Southeast
[b]Case 1 is used only for calculating IM As described below, these examples illustrate how well the inversion can recover an unknown bottom roughness distribution. Case 1 is a trivial simulation that has no variations in bottom friction or the bathymetry shown in FIG. 1. It is used to compute the Influence Matrix as discussed below. Cases 2 through 5 examine different $k_b$ distributions shown in FIG. 2 that represent patches of either rougher ($k_b$=0.07 m) or smoother ($k_b$=0.005 m) bottom on an otherwise uniform seafloor ($k_b$=0.05 m). Cases 5 and 6 introduce random noise into the wave field to determine if the inversion can recover a bottom roughness field that includes a low-friction patch. Case 7 incorporates an unknown embayment that represents a large error in bathymetry, and case 8 includes unknown localized bathymetric highs ("shoals") having amplitudes from 0.5 to 2 m as well as a patch with reduced bottom roughness. These cases will be used to describe different applications of the method of the present invention.

The inversion described herein relies on computing a large number of solutions using a numerical wave model and finding the optimal solution by minimizing the error in the model-predicted significant wave height. One advantage is that the procedure is independent of the wave model used. The penalty in terms of slower calculations is considered acceptable because it is possible to improve the numerical technique later to increase efficiency.

The method for retrieving the bottom roughness field in accordance with the present invention comprises the following general steps:

(1) Collect dense measurements of the wave height field at specified points over the area of interest at a single point in time, each such point in the area of interest being designated by coordinates of the nodes ($i_o$, $j_o$) of an output grid OG.

(2) Estimate an initial homogeneous bottom roughness field having an initial bottom roughness parameter $k_b$ for the area of interest. A more accurate initial estimate of the bottom roughness field will provide a faster convergence.

(3) Calculate the normalized wave height error at each node ($i_a$, $j_a$) on an analysis grid AG caused by a small perturbation $\gamma k_b$ of the estimated bottom roughness parameter relative to the wave heights associated with the initial estimated bottom roughness parameter. The values of these normalized errors at each node on the analysis grid comprise the Influence Matrix IM, which has a number of columns equal to the number of cells on the OG and a number of rows equal to the number of cells on the AG.

(4) Run the numerical wave model with the estimated bottom roughness parameter to find a predicted wave field.

(5) Compare the wave height at each node ($i_o$, $j_o$) of the predicted wave field to the measured wave heights at each such node to obtain a wave height error $E_{HO}$ for each node of the output grid OG. Noise is removed from the resulting $E_{HO}$ field and the cell in the output grid with the maximum wave height error $E_{MAX}$ is found.

(6) If $E_{MAX}$ is greater than a specified minimum value, the IM is applied to the $k_b$ value at each point ($i_a$, $j_a$) on the analysis grid AG to obtain a new value of $k_b$.

(7) Steps (4) through (6) are then repeated until $E_{MAX}$ is within the predetermined tolerance, at which point processing ends and the values of $k_b$ that result in that iteration's wavefield are recovered.

This algorithm includes two key procedures, step 3 (calculating the Influence Matrix) and step 6 (updating the bottom friction field). These steps are described in more detail below.

Calculating the Influence Matrix.

One factor in finding the change in bottom roughness from (Eqn. 8) is the value of elements (m, $n_e$) in the IM for (m=1, na×ma). This factor reflects the physical influence of bottom friction on wave height as represented by the wave model at cell ($i_{oe}$, $j_{oe}$) and on all other cells within the physical domain.

The Influence Matrix IM computed in step 3 includes the impact of a change in bottom roughness at a given point on every other point within the model grid. It is computed only once using the initial estimate as the bottom roughness field. The Influence Matrix IM contains no×mo columns and na×ma rows, where no and mo are the number of cells along the x and y axes on the output grid OG and na and ma are the number of cells along the x and y axes of the analysis grid AG. Each point ($i_o$, $j_o$) on the OG corresponds to a column n in the IM, where n=1 ... no×mo, and every point ($i_a$, $j_a$) on the AG corresponds to a row m in the IM, where m=1 ... na×ma.

The elements of the Influence Matrix IM can then be found by repeating the following steps for each point on the AG, or row m in the IM:

(i) The bottom roughness parameter $k_b$ at node ($i_a$, $j_a$) corresponding to row m is given a small perturbation γ from the initial estimate to result in a modified roughness parameter $\gamma k_b$. The value of γ should be sufficient to have a noticeable effect (or influence) on the wave height field. In the exemplary embodiment described herein, γ=0.1. The aggregate of the modified bottom roughness parameters γ$k_b$ at each node ($i_a$, $j_a$) comprises a modified bottom roughness field.

(ii) A new wave field is computed with the numerical wave model using the modified friction field.

(iii) The normalized error $E_{m,n}$ in the predicted wave height $H_{P,n}$ on the output grid (or column n in IM) caused by the modified $k_b$ at node ($i_a$, $j_a$) is then given by:

$$E_{m,n} = \frac{|H_{l,n} - H_{p,n}|}{E_{MAX}} n = 1, no \times mo \quad (4)$$

where: $H_{l,n}$=the baseline wave height predicted by the wave model for the baseline estimate of $k_b$ and the initial conditions (see, e.g., Case 1 shown in Table 1) for each cell on the OG and $E_{MAX}$=maximum value of E. The normalized error ranges from 0 to 1. Note that E is positive because it represents the strength of the influence only.

After steps (i) through (iii) are completed for all rows m=1 . . . naxma, which correspond to the points on the analysis grid AG, the following IM results:

$$M = \begin{bmatrix} E_{1,1} & E_{1,2} & E_{1,3} & \ldots & E_{1,no \times mo} \\ E_{2,1} & E_{2,2} & E_{2,3} & \ldots & E_{2,no \times mo} \\ E_{3,1} & E_{3,2} & E_{3,3} & \ldots & E_{3,no \times mo} \\ E_{na \times ma,1} & E_{na \times ma,2} & E_{na \times ma,3} & \ldots & E_{na \times ma,no \times mo} \end{bmatrix} \quad (5)$$

The wave fields computed by the numerical model are dependent on the boundary conditions and bathymetry; therefore, it is unnecessary to recompute the IM unless these are intentionally changed. For application to the coastal ocean, the IM would be calculated for a steady wave field using available bathymetry but it would need to be recomputed if the wave field changed during the study interval. Because the wave fields computed by the numerical wave model are stationary wave fields, the number of computations required is greatly reduced. The numerical wave model is thus run na x ma times to correspond to each node in the analysis grid (e.g., 812 times for the analysis grid AG used in the present disclosure).

Each row of the IM contains the normalized wave height errors on the output grid from (Eqn. 4) for the specified bottom roughness change at a single point on the analysis grid. However, it should be noted that the choice of the analysis and output grids is not important to the inversion method itself. The grid attributes are selected for convenience of computation and the desired accuracy. We have retained the multiple grid nomenclature for generality. The ordering of grid points in the IM is not important because the normalized errors E are mutually independent.

Updating the Bottom Roughness Field.

The bottom roughness field is updated in step 6 using the column in the IM corresponding to the cell on the OG with the largest error. After a new wave field has been computed in step 4 of the analysis cycle, the computed wave heights are compared to the observed wave heights and, if necessary, the bottom friction parameter is modified. This is accomplished in steps 5 and 6 of the inversion using the following procedure, which is repeated until the maximum wave height error is within a specified tolerance:

(A) The wave height error at each point on the OG is given by:

$$E_{HO}=H_{Ac}-H_c \quad (6)$$

where: $H_c$ is the significant observed wave height (or in cases 2 through 8 described below, the simulated wave height from the control run); and $H_{Ac}$ is the wave height computed by the wave model with the retrieved $k_b$ field. The initial estimate of $k_b$ is used on the first iteration. Note that positive values of $E_{HO}$ indicate over-prediction of the initial $k_b$. The sign of the error is mapped to the AG and saved as ψ for use in step C below.

(B) Noise is removed from the $E_{HO}$ field with a 3×3 (2D nine-point) filter, and the cell with the maximum wave-height error magnitude ($i_{oe}$, $j_{oe}$), which corresponds to column $n_e$ in the IM, is found.

(C) Noting that every point ($i_a$, $j_a$) on AG corresponds to a row m in the IM, the roughness length for all grid points on the AG is updated from the previous analysis cycle by:

$$k_{b,m}^P = k_{b,m}^{P-1} + \Delta k_{b,m}^P \quad m=1, na \times ma \quad (7)$$

where: p=iteration or analysis cycle; and $\Delta k_{b,m}^P$=change in roughness length, which is given by:

$$\Delta k_{b,m}^P = \alpha \cdot IM_{m,n_e} \cdot \psi_m \quad m=1, na \times ma \quad (8)$$

where α is a constant with the same units (meters) as the key parameter being retrieved, in this case $k_b$. A larger value of α means more modification to the friction field with each analysis cycle. The sign of the change to the friction field is obtained from ψ.

Application of Algorithm.

This section presents the results of applying the inversion method described above to the cases listed in Table 1. In the description below, simulations using known bottom roughness fields, which serve as proxies for dense data set observations of wave height, are referred to as control runs. Results are presented only for Cases 2 through 8 shown in Table 1 because Case 1 is only used for computing the influence matrix. The convergence behavior of the algorithm is evaluated by comparing the significant wave heights computed during the analysis to those from the control run. The predicted wave heights are very sensitive to errors in bottom roughness and even small errors can indicate problems, requiring examination of the retrieved roughness fields. The accuracy of the solutions will be examined by comparing the retrieved $k_b$ fields to the known fields from the control runs.

Steps 4 through 6 comprise the analysis cycle of the algorithm used in the present invention. As will be seen, the number of analysis cycles required is different for each of the cases discussed herein.

The algorithm of the present invention assumes a linear relationship between the changes in bottom friction and wave height, though faster convergence might be achieved through the use of a more accurate nonlinear relation, particularly when coupled to a relaxation scheme. The constant a was evaluated in a sensitivity study on Case 4 with three parameterizations: (a) a constant value of 0.01 m; (b) using a decreasing step function; and (c) decreasing magnitude with cycle number. The maximum error $E_{HO}$ was reduced to 0.05 m in 680 cycles for a constant value and in fewer than 500 cycles for (c), which had the fastest convergence. A constant value of α=0.01 m will be used in the present disclosure in order to avoid changing the parameterization for different cases.

Case 2: Low-Friction Feature

Figure 2A:
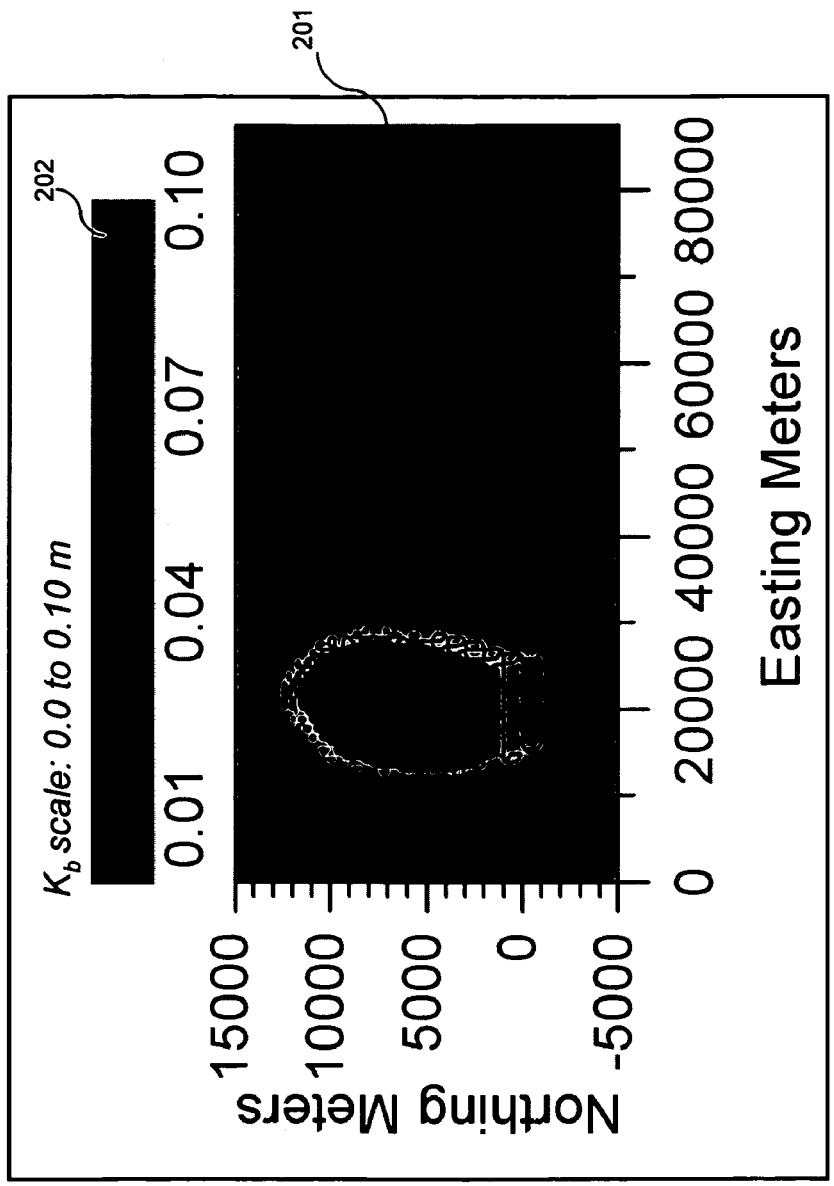
FIGS. 2A-2C depict plots of simulated bottom friction fields used in three exemplary applications of the inversion method of the present invention.

FIG. 2A shows a simulated bottom roughness field 201, 202 for Case 2, i.e., a uniform friction field with $k_b$=0.05 m, which represents ripples that are 0.05 m high, and an elliptical feature with reduced bottom roughness ($k_b$=0.005 m) that extends from a location on the ocean floor having water depth of 12 m to a location having a depth of 20 m. In the ocean, a feature like this could be caused by finer sediments on the ocean floor, which would cause smaller ripples in the floor's topography. The inversion for this case using the method of the present invention is presented in detail below.

Figure 3A:
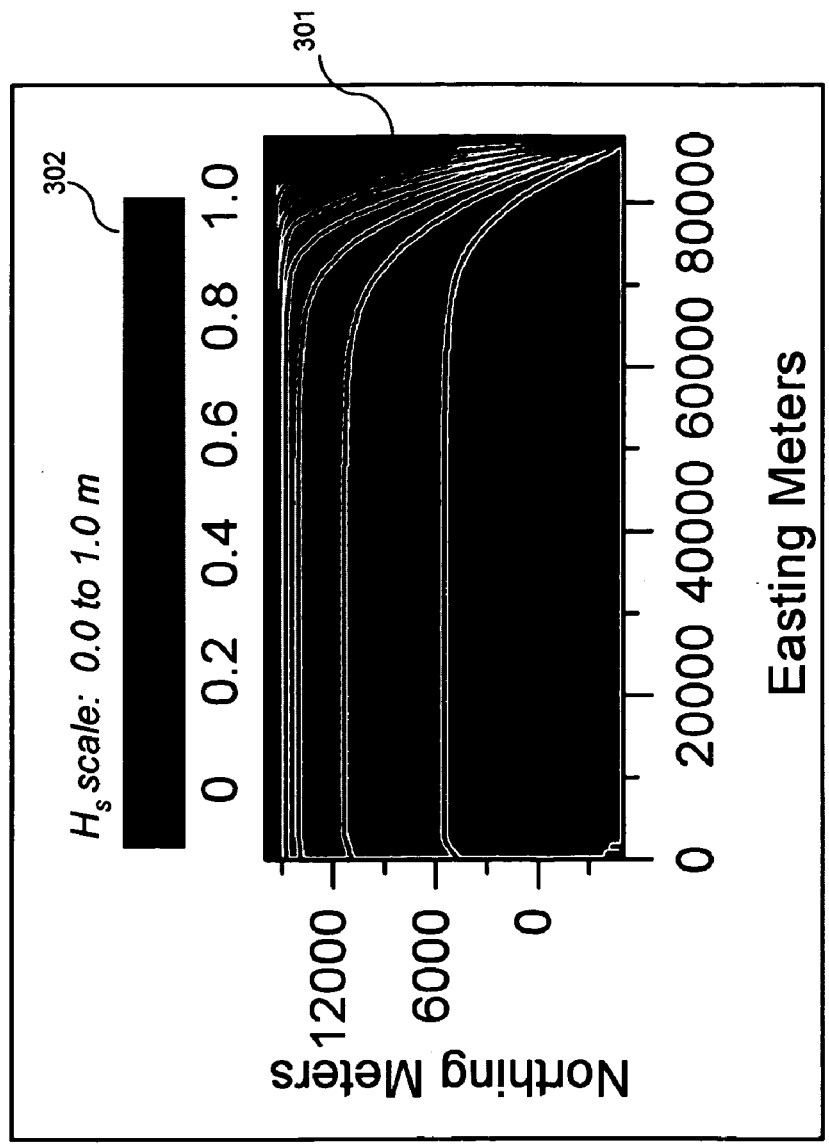
FIGS. 3A-3D depict plots of simulated wave height corresponding to different bottom friction fields used in a baseline case and three exemplary applications of the inversion method of the present invention.
Figure 3B:
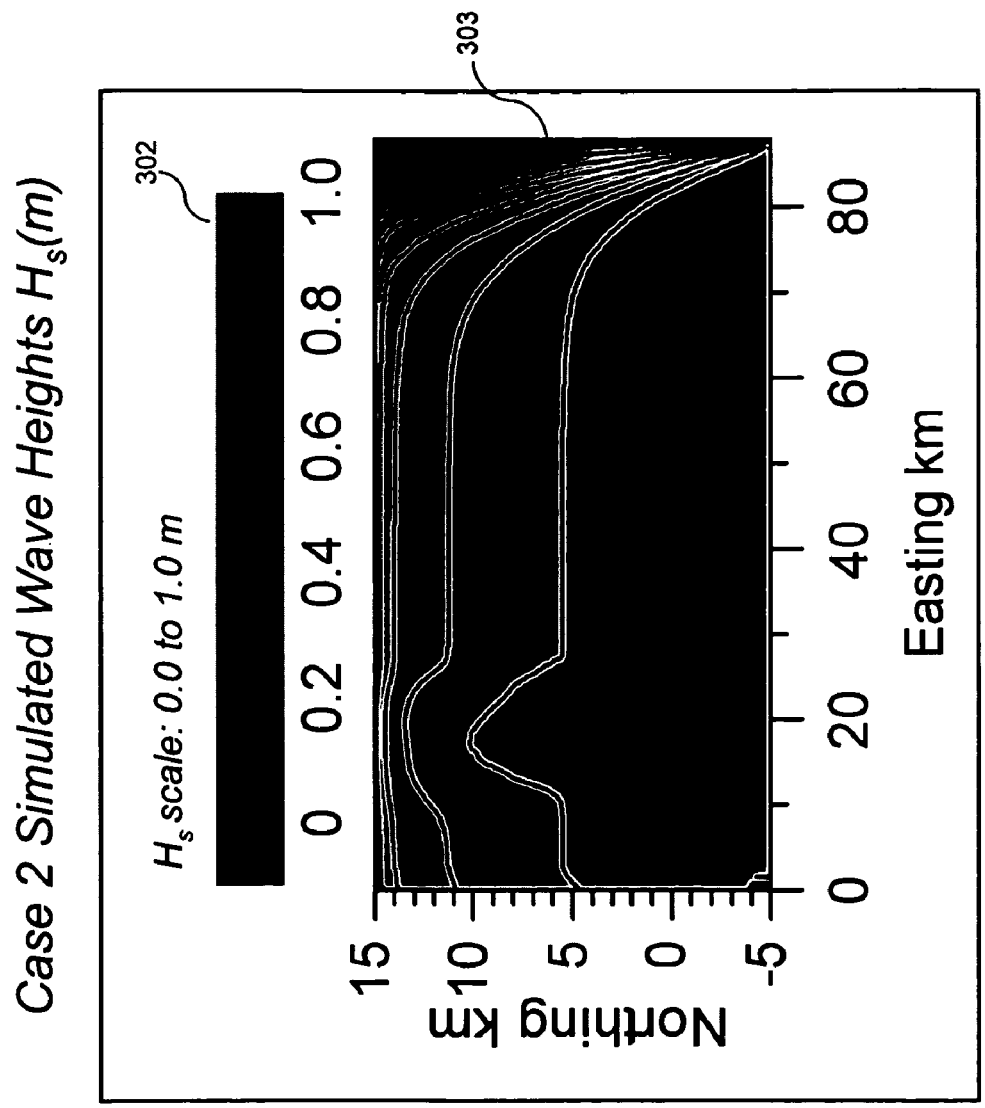

FIG. 3B shows a plot of simulated wave heights for Case 2. As seen from the wave height plot 301, 302 in FIG. 3B, the height of the waves decreases decrease landward away from the feature because the increase in $H_S$ by shoaling is negated by bottom friction. This cross-shore distribution is in agreement with observations from a natural beach with similar incident waves. See, e.g., Elgar et al. 1997, infra. The decreased dissipation of the wave energy over the feature results in higher waves closer to the coast.

Figure 4A:
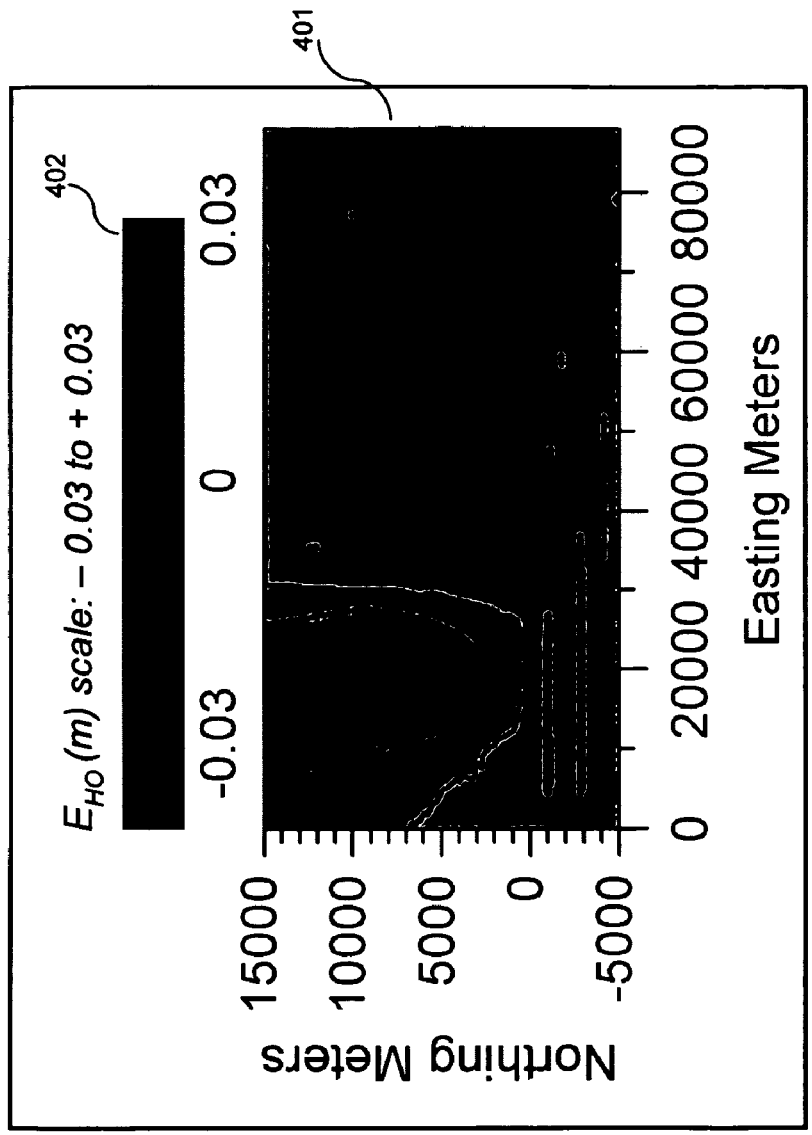
FIGS. 4A-4C depict plots of results of the first exemplary application of the inversion method of the present invention after one analysis cycle.
Figure 4B:
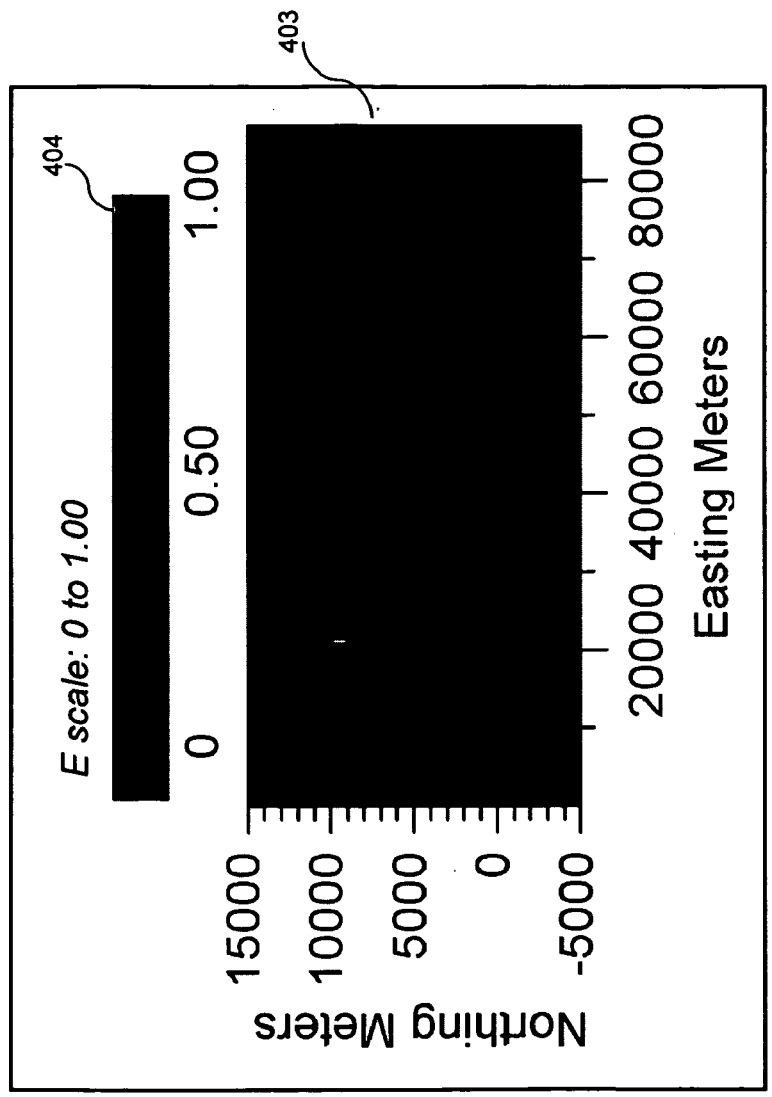
Figure 4C:
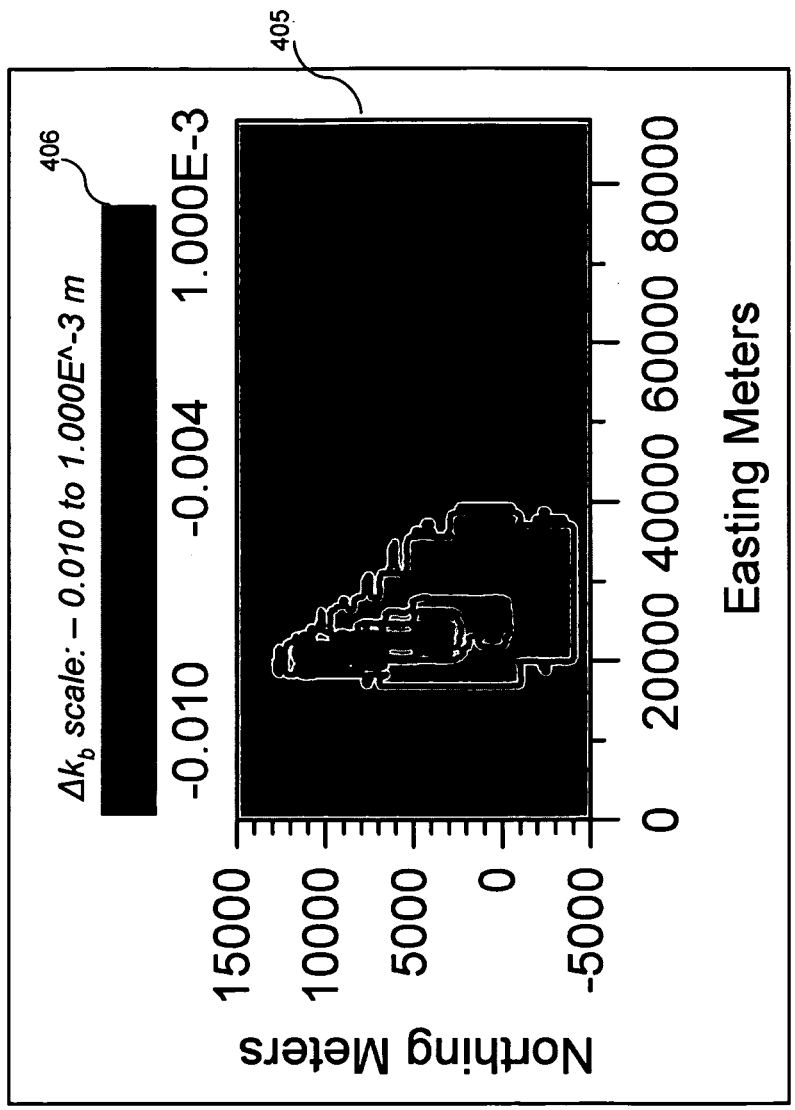

FIG. 4A shows a plot 401, 402 of $E_{HO}$ (Eqn. 6) after one analysis cycle. This plot shows that the maximum error occurs at the shallow end of the feature. The errors are negative over the feature itself because of its much lower roughness (0.005 m) and resulting higher waves. The values 403, 404 of E found from Eqn. 4 for column $n_e$ of IM are shown in FIG. 4B, which indicates where a change in bottom friction will have the greatest influence on the wave height at ($i_{oe}$, $j_{oe}$). For example, E is near zero far from the friction feature and in deep water, and large at the shallow end of the feature. The largest values of E are oriented south-southeast because bottom dissipation impacts the wave field on the leeward side of a roughness feature. The errors shown in FIG. 4B are used in Eqn. 8 to calculate the change $\Delta k_b$ to the roughness field after the first analysis cycle. The results 405, 406 of this calculation are shown in FIG. 4C. As can be seen, the largest changes to the roughness field occur over the center of the feature.

Figure 5:
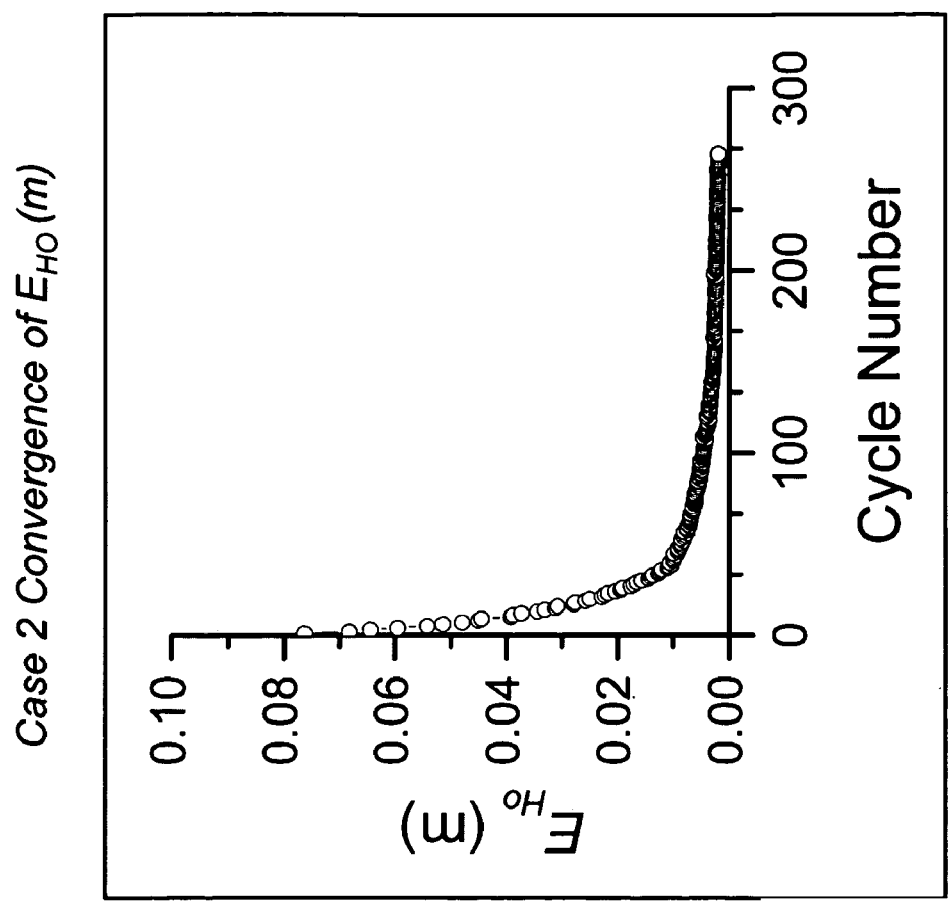
FIG. 5 depicts a convergence plot of the maximum value of the filtered wave height error $E_{HO}$ as a function of analysis cycle in the first exemplary application of the inversion method of the present invention.

FIG. 5 shows the maximum wave height error $E_{HO}$ for each analysis cycle. As seen in the plot shown in FIG. 5, the maximum $E_{HO}$ decreases to less than 0.01 m (approximately 1% for the 1 m waves used in this study) after fewer than 50 analysis cycles. As noted above, the inversion continues until the error is below a specified tolerance, and so after 261 cycles, the inversion stops because the specified tolerance has been reached, e.g., $E_{HO}$ is close to zero.

Figure 6A:
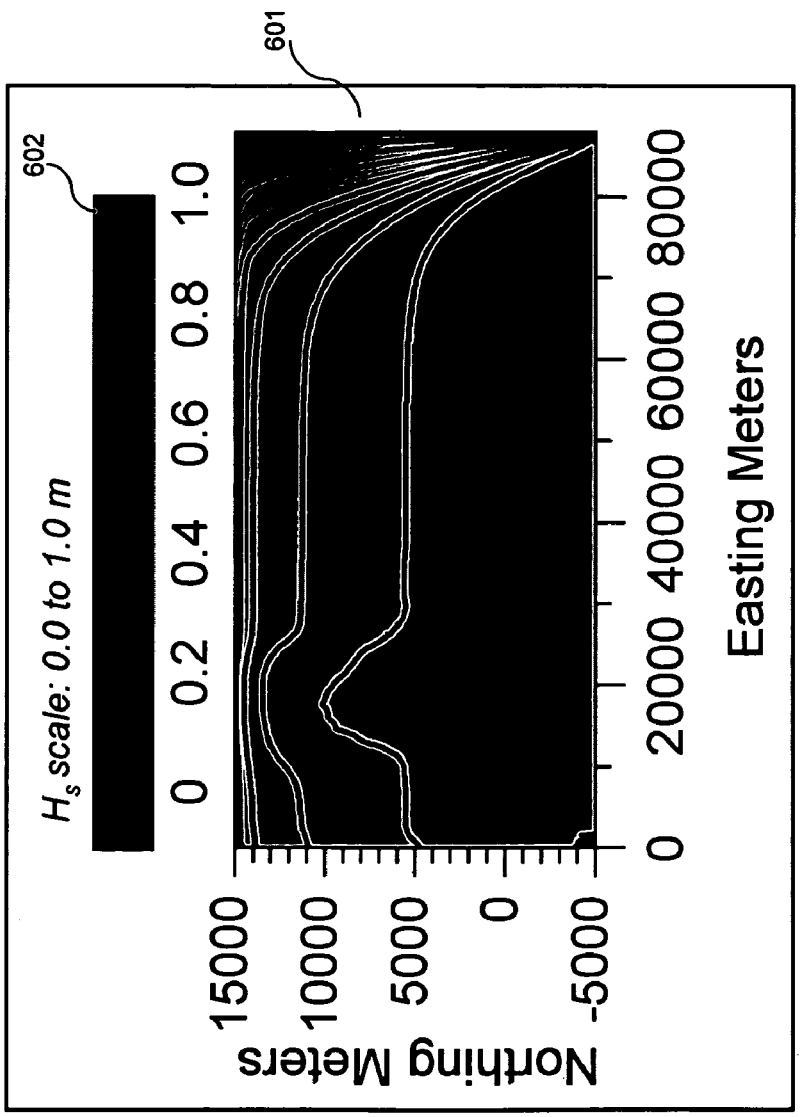
FIGS. 6A-6C depict plots of results of the first exemplary application of the inversion method of the present invention after 261 analysis cycles.
Figure 6B:
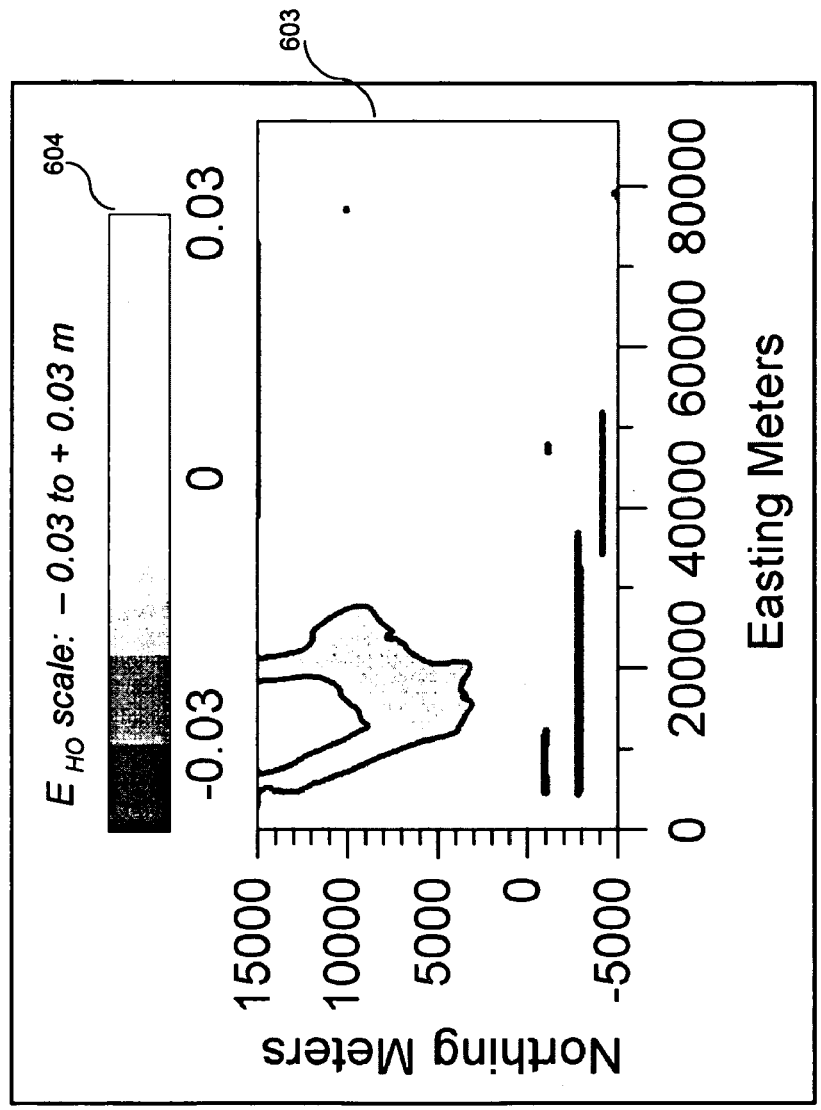

FIG. 6A shows the calculated significant wave height field that is calculated by the SWAN wave model using Eqn. 1 described above for the $k_b$ field retrieved by the inversion. As can be seen from a comparison of FIGS. 6A and 3B, the calculated significant wave height field 601, 602 shown in FIG. 6A for the values of $k_b$ retrieved after 261 analysis cycles using the inversion method of the present invention is nearly indistinguishable from the wave height field 303, 302 for the known $k_b$ shown in FIG. 3B. In addition, as shown in FIG. 6B, the values 603, 604 of $E_{HO}$ are near zero, indicating that the inversion has in fact converged.

Figure 6C:
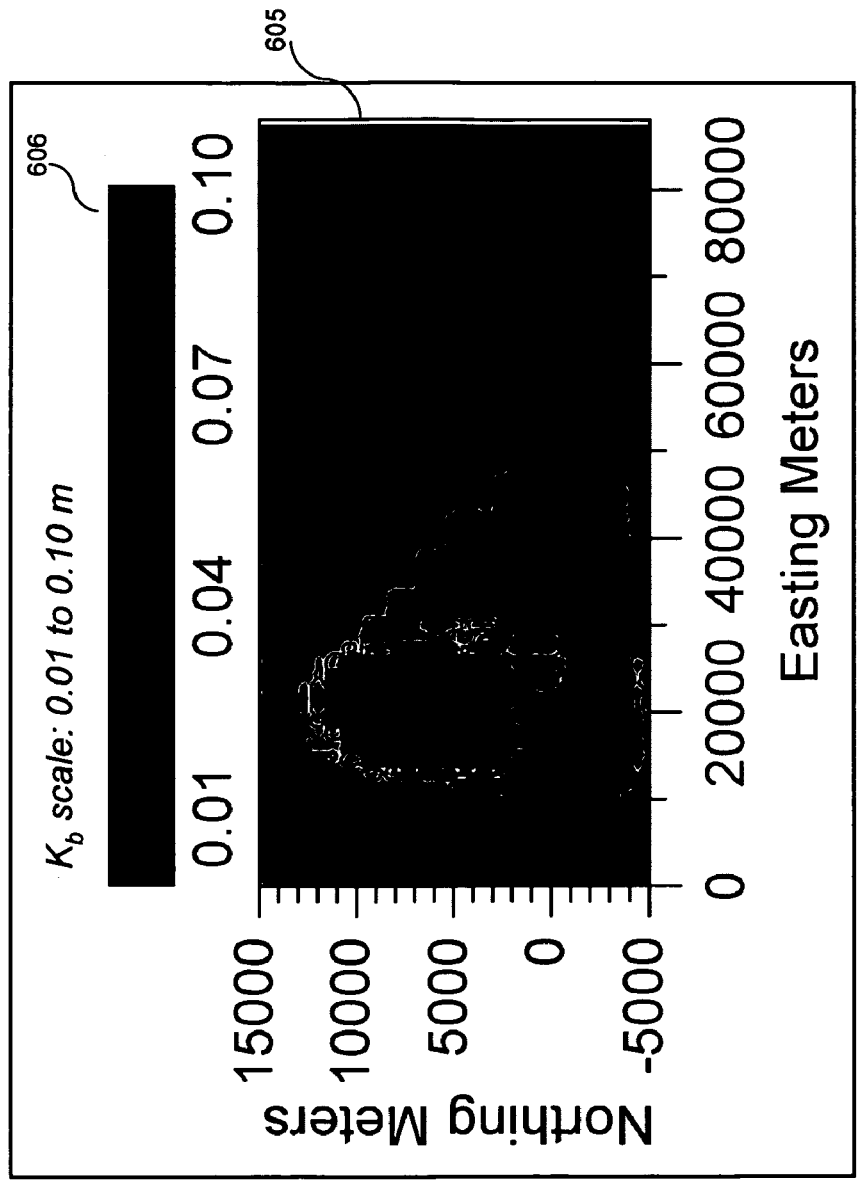

As shown in FIG. 6C, the recovered $k_b$ field 605, 606 also is close to the original field shown in FIG. 2A. However, as seen by a comparison of FIGS. 2A and 6C, the recovered values comprise range of values from a minimum of 0.005 m to the background value 0.05 m, as shown by the shading indicated by $k_b$ scale 606, whereas in the control run the $k_b$ values have a binary distribution, i.e., either 0.005 m or 0.05 m, as shown by the contrasting shading in accordance with $k_b$ scale 202. The normalized mean error between these values and the original field is −4% ($k_b$ over-predicted) and the standard deviation is 45%. Note that the retrieved bottom roughness is less accurate in deeper water.

Case 3: High-Friction Feature

Figure 2B:
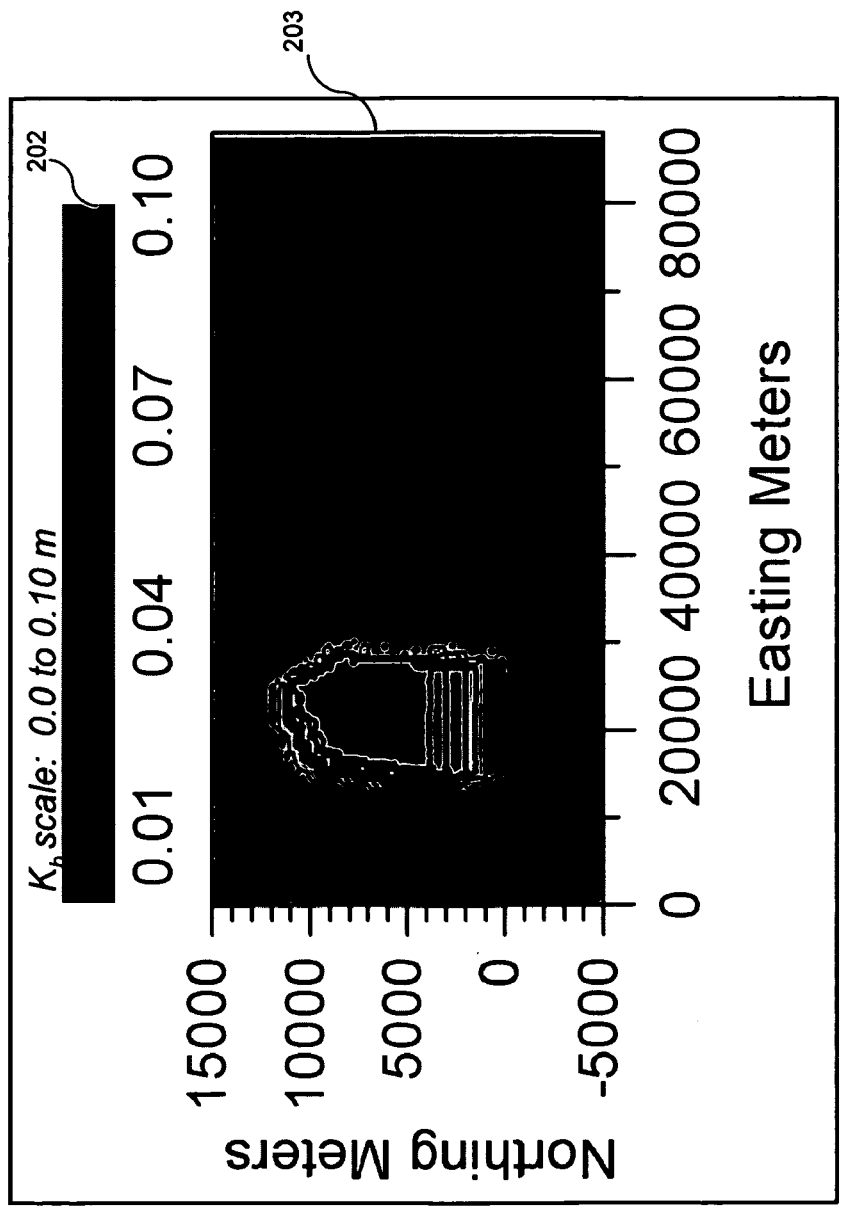

FIG. 2B depicts the simulated friction feature for Case 3, i.e., a background bottom roughness field having $k_b$=0.05 m with an elliptical feature having a bottom roughness parameter $k_b$=0.07 m. This would correspond to a coastal floor having heterogeneous sediment characteristics including an area with greater tendency to dissipate wave energy, for example, a patch of coastal floor having larger sand ripples than the surrounding area. We note that a larger value of $k_b$ cannot be used in the exemplary embodiment described herein because the friction term in SWAN (Eqn. 3) effectively limits the bottom roughness length. It should be noted, however, that in cases where other numerical wave models are used, the value of $k_b$ may not necessarily be so limited.

Figure 3C:
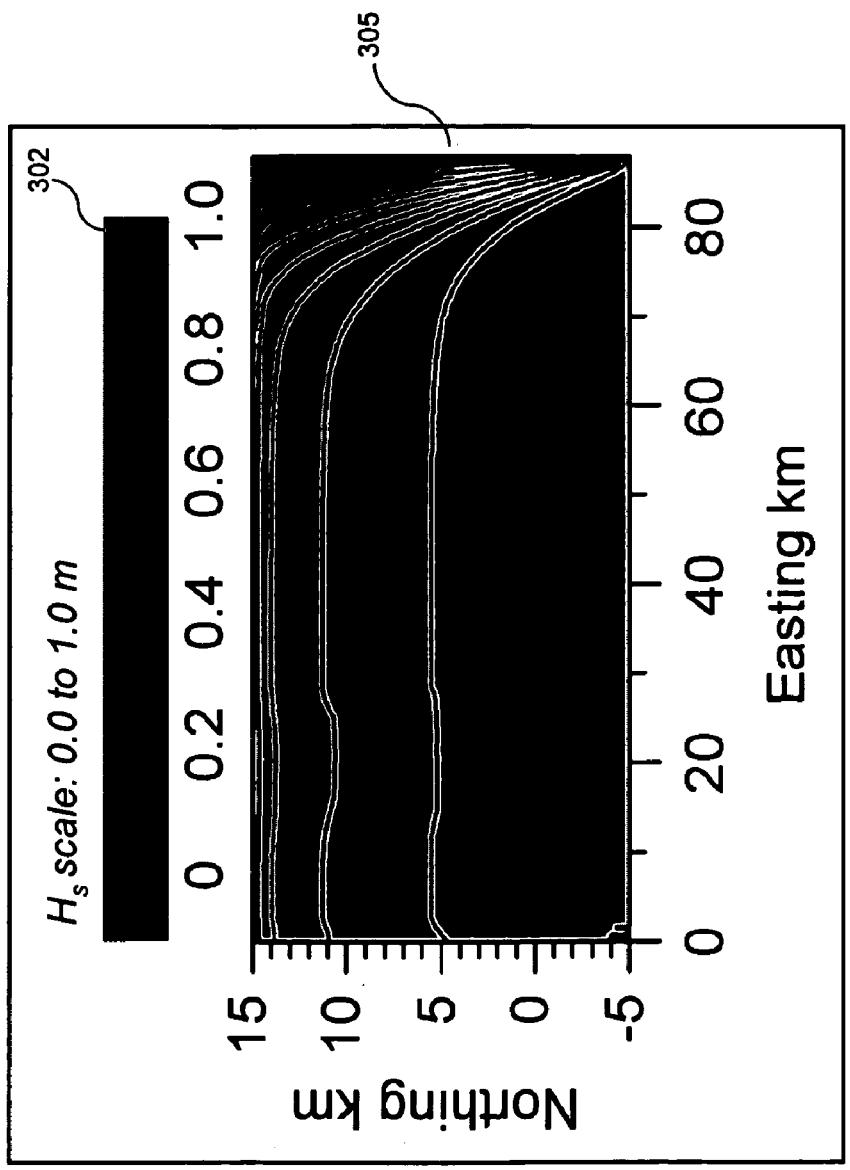

Wave heights 305, 302 for this configuration are shown in FIG. 3C. As seen in FIG. 3C, although the effect of such a higher-friction feature on wave height is weak, it is noticeable.

Figure 7:
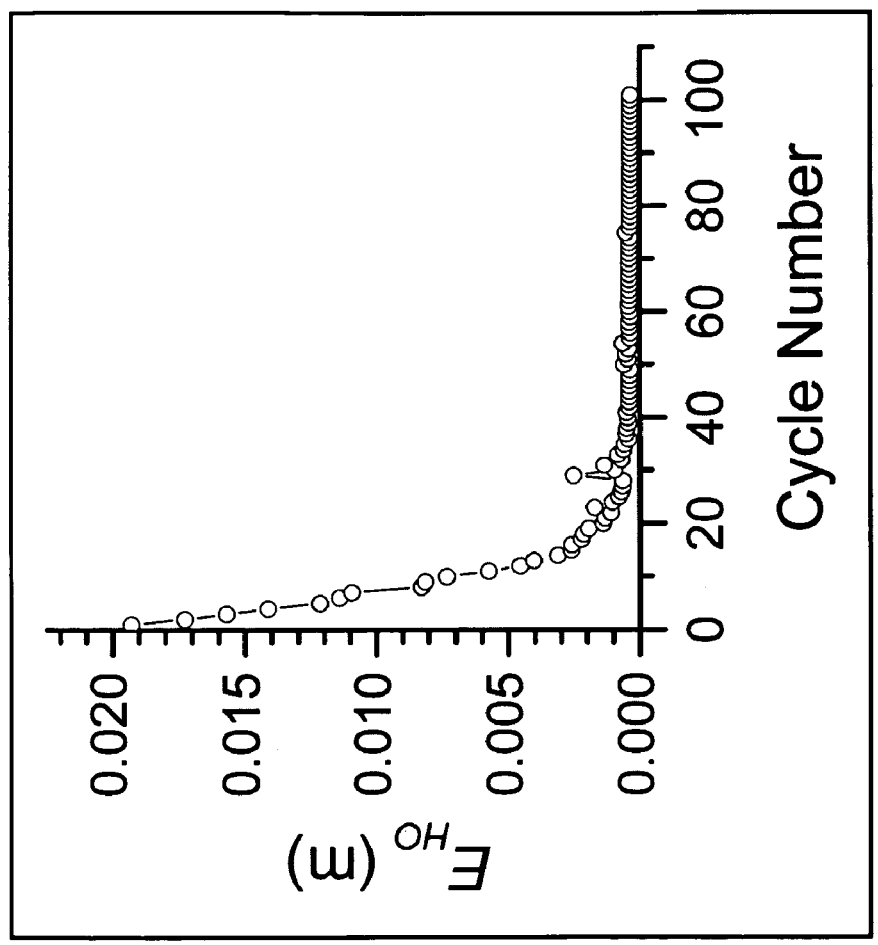
FIG. 7 depicts a convergence plot of the maximum value of the filtered wave height error $E_{HO}$ as a function of analysis cycle in the second exemplary application of the inversion method of the present invention.

As shown in FIG. 7, the maximum wave height error $E_{HO}$ decreases sharply, from approximately 0.02 m after one cycle to less than 0.0006 m after 41 cycles. The error is positive because the initial estimate for $k_b$ (0.05 m) causes over-prediction of the wave heights over the patch. The dependence of the maximum $E_{HO}$ on cycle number is similar to that seen in Case 2 (FIG. 5) but in Case 3, the solution converges much faster because of the reduced effect of the Case 3 high-friction feature having $k_b$=0.07 m versus the low-friction feature having $k_b$=0.005 in Case 2.

Figure 8A:
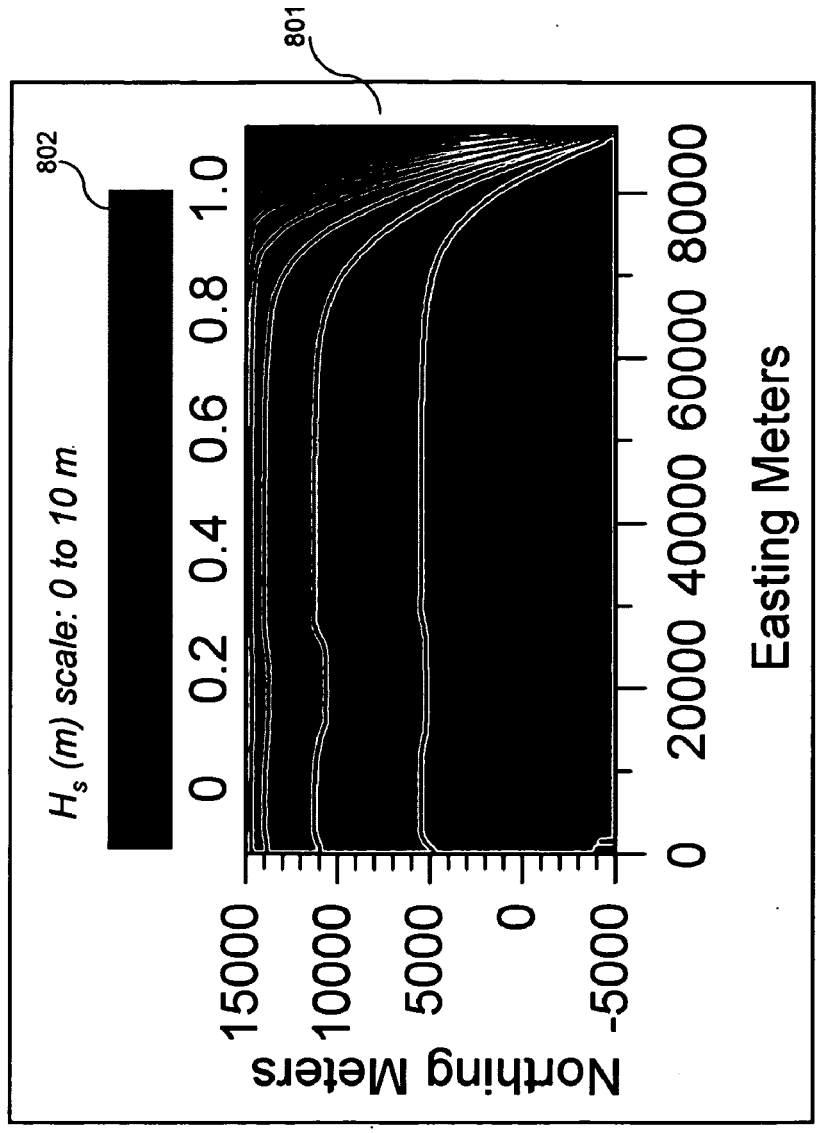
FIGS. 8A and 8B depict plots of results of the second exemplary application of the inversion method of the present invention after 41 analysis cycles.
Figure 8B:
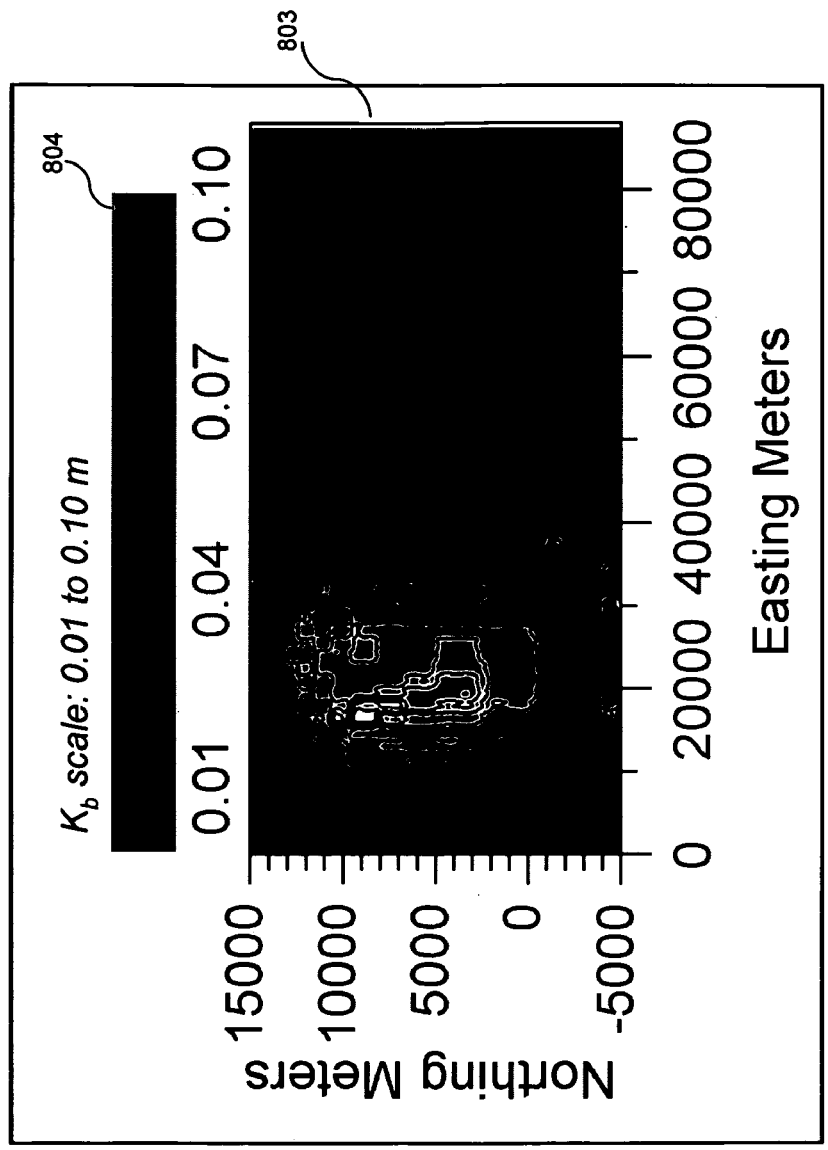

The final bottom roughness field 803, 804 for Case 3 as calculated by the inversion method of the present invention, shown in FIG. 8B, is similar to the initial field 203, 202 for the same parameters shown in FIG. 2B. The mean error for the retrieved $k_b$ field value versus the $k_b$ control value of 0.07 m is less than −1%, and the standard deviation of the error is less than 4.8%. This result is consistent with the small errors in the predicted wave heights.

In addition, a plot of the calculated wave heights 801, 802 based on the recovered $k_b$ value for Case 3 is shown in FIG. 8A. As can be seen, this plot is very nearly identical to the control plot 305, 302 of simulated wave heights for a bottom having a background $k_b$=0.05 m and a high-friction feature having a $k_b$=0.07 m shown in FIG. 3C. In both cases, the wave height decreases as the wave approached the shoreline, with a noticeable area between approximately x=18 km and x=28 km where the wave height decreases more quickly. This corresponds to the higher friction feature shown by the $k_b$ plots 203 and 803 in FIGS. 2B and 8B. This decrease in wave height as the wave travels over a higher friction area can be contrasted with the plots of the Case 2 wave heights 303 and 601 shown in FIGS. 3B and 6A, which show a noticeable area of increased wave height corresponding to the lower friction feature shown by the $k_b$ plots 201 and 605 in FIGS. 2A and 6C.

Case 4: Waves Over Two Cross-Shore Low-Friction Areas

Figure 2C:
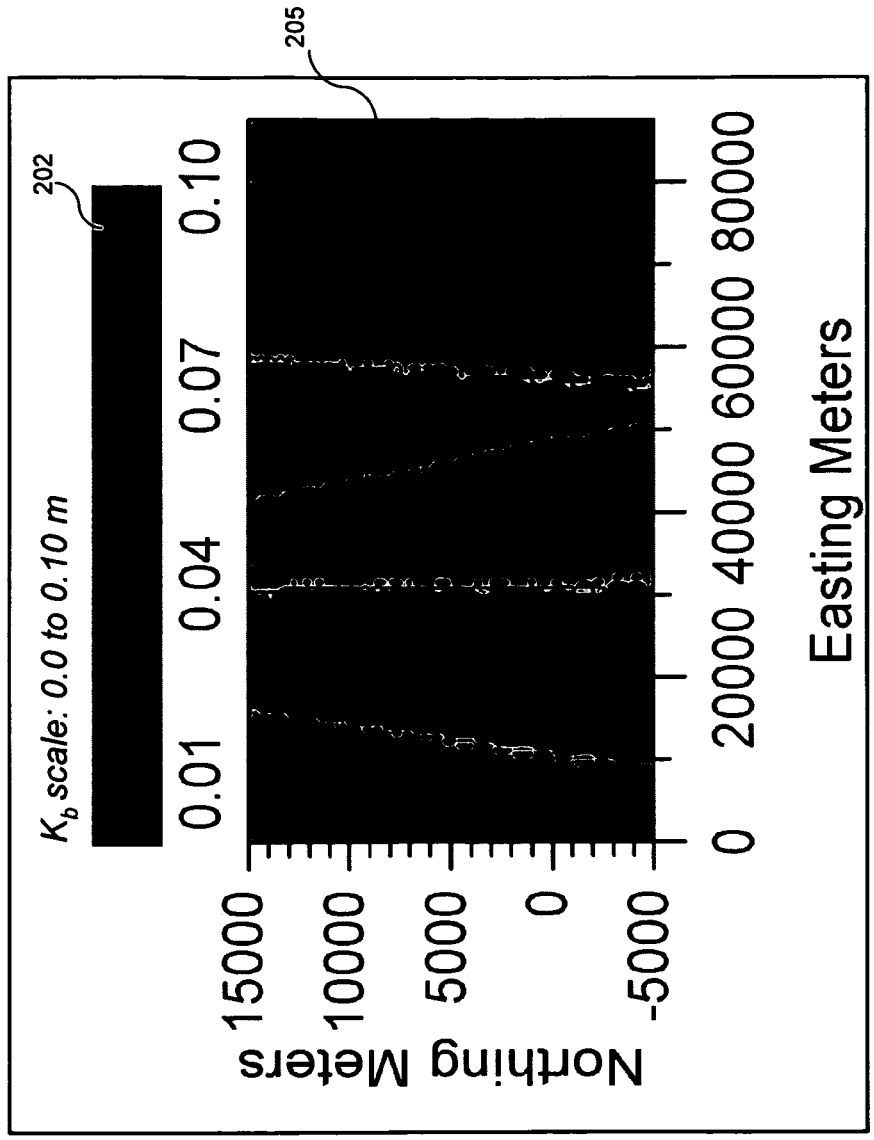
Figure 3D:
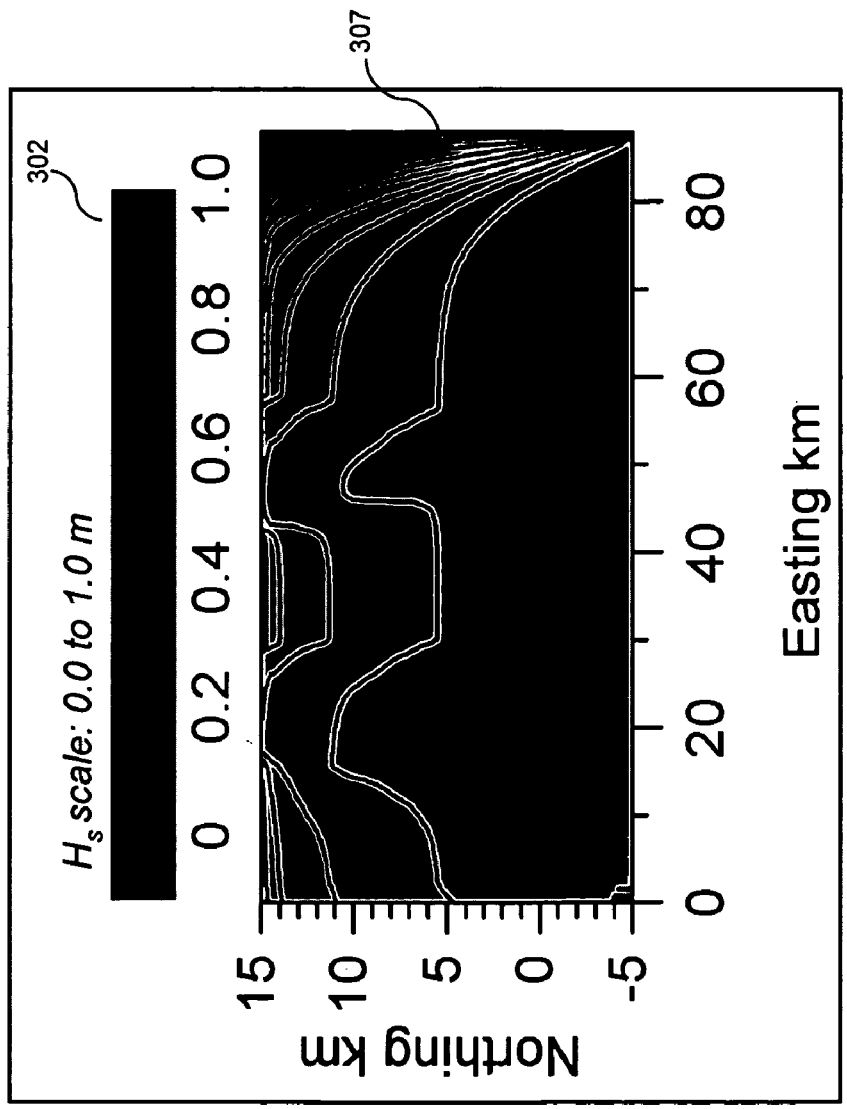

As seen in Table 1 and in the plot 205, 202 shown in FIG. 2C, Case 4 involves two low-friction shore-normal features, each having a bottom roughness parameter $k_b$=0.005 m. This pattern is more representative of the seafloor than the previous cases but also increases the difficulty of the solution. As seen in the wave height plot 307, 302 shown in FIG. 3D, the bottom roughness field of Case 4 has the greatest effect on the control-run wave heights of the three cases discussed so far. Wave heights increase at two points along the shore because of the two low-friction features, though it may be noted that neither the features nor the wave field are symmetric.

Figure 9:
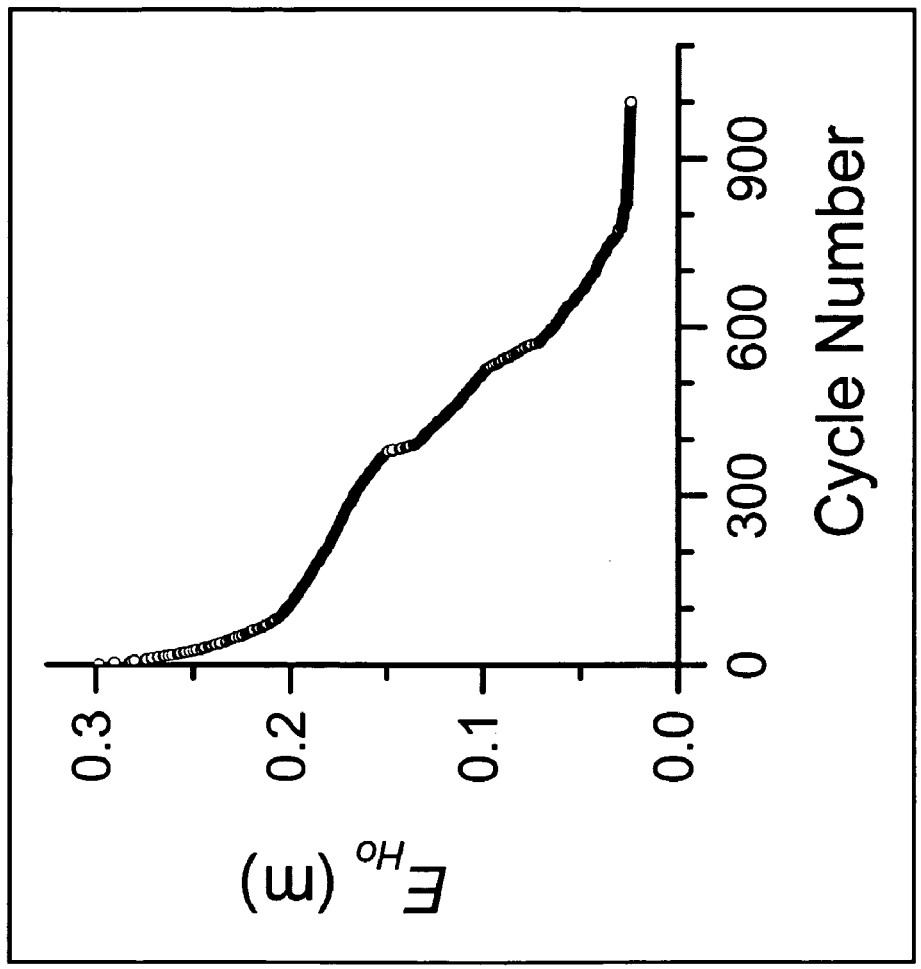
FIG. 9 depicts a convergence plot of the maximum value of the filtered wave height error $E_{HO}$ as a function of analysis cycle in the third exemplary application of the inversion method of the present invention.

In this case, as seen in FIG. 9, the maximum $E_{HO}$ after one cycle is 0.3 m, which is much greater than for the previous cases. The maximum occurs within the western feature. The values of E from the IM corresponding to cell ($i_{oe}$, $j_{oe}$) (not shown) indicate that correlation distances are much shorter for these shoreline-attached features than for offshore features. This is consistent with the physical problem; in shallower water, the ratio between near-field wave energy dissipation and far-field dissipation becomes larger; thus the changes in bottom friction that are used in computing IM do not have a far-reaching influence.

Figure 10A:
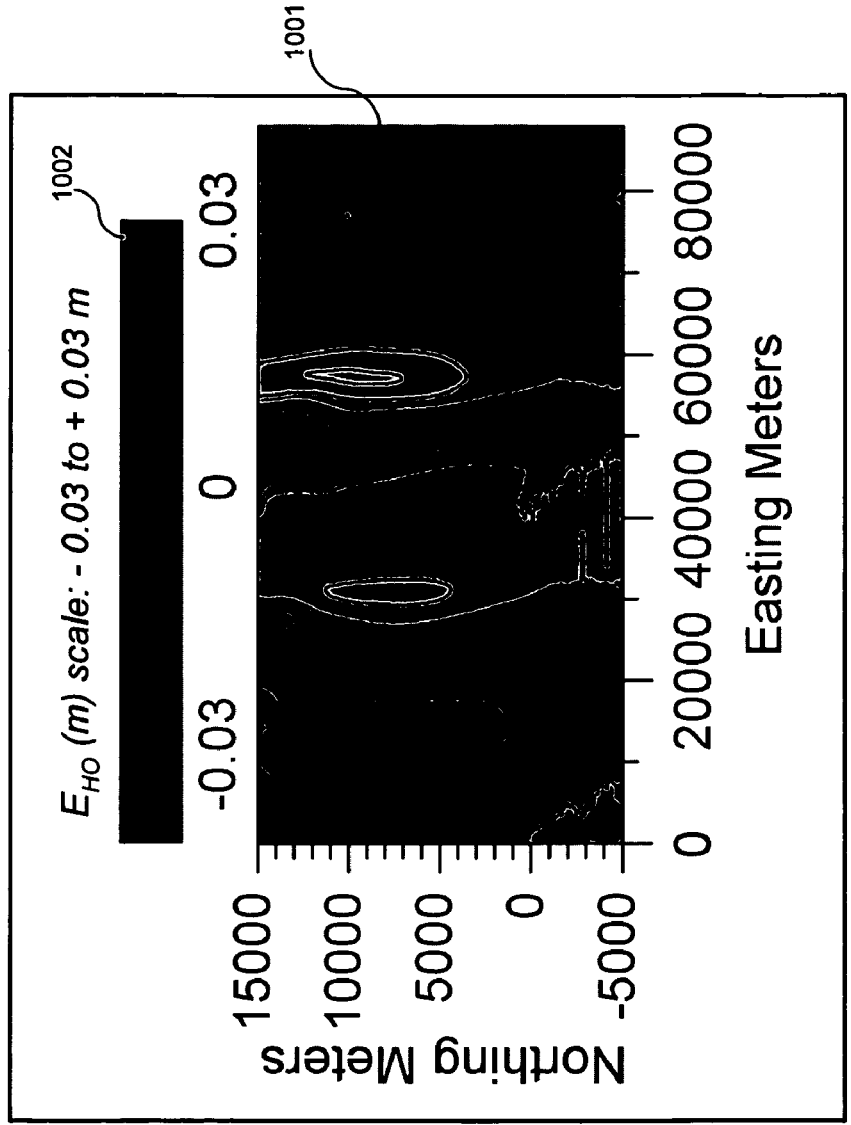
FIGS. 10A and 10B depict plots of the results of the third exemplary application of the inversion method of the present invention after 1000 analysis cycles.

As shown in FIG. 9, maximum $E_{HO}$ decreases to less than 0.03 m after 800 cycles but the inversion continues until cycle 1000, with $E_{HO}$ approaching but never reaching zero. As shown in FIG. 10A, the largest wave height errors (i.e., the greatest difference between the measured wave heights and the wave heights predicted by the model) 1001, 1002 in this case are in shallow water east of the features. Positive values of $E_{HO}$, shown in darker shading, result from over-correction of $k_b$ where no differences in bottom friction actually existed. This is caused by the choice of the analysis grid AG, which spreads the correction from IM over more cells on the output grid OG. The large error (~3%) suggests that the retrieved friction field should be examined in detail.

Figure 10B:
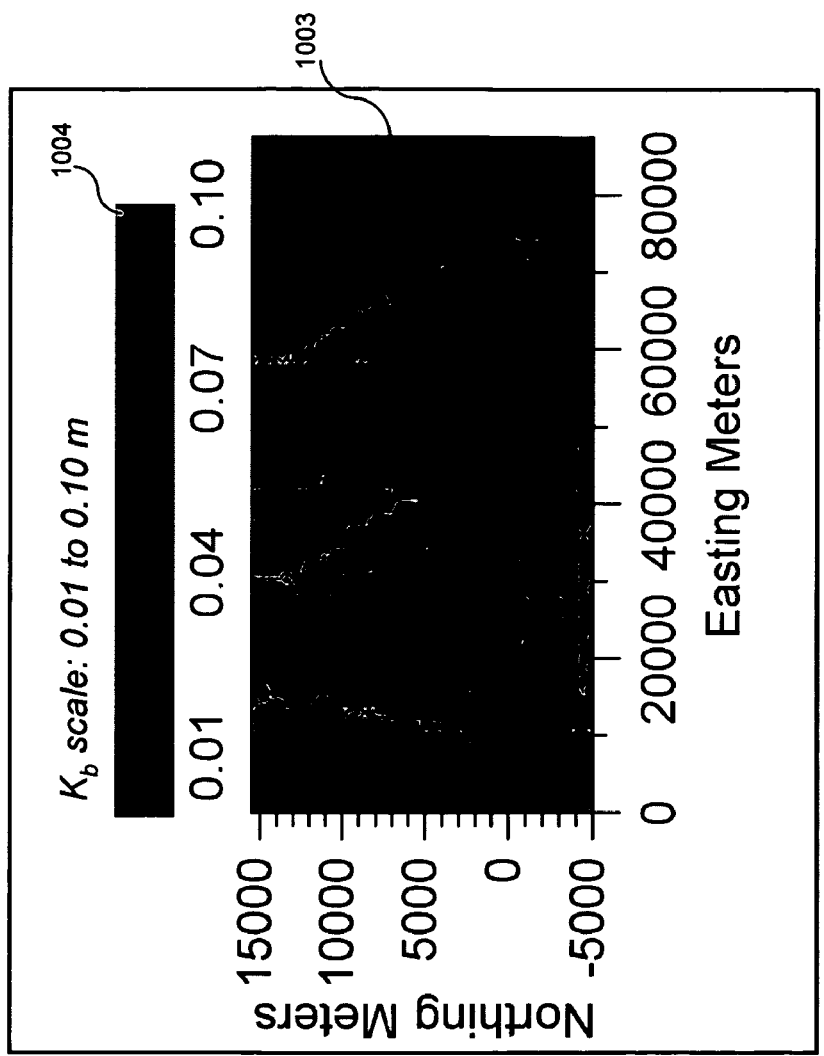

The retrieved friction field 1003, 1005 is shown in FIG. 10B. As seen in FIG. 10B, the retrieved friction field resolves the two features but their shapes have not been fully recovered offshore because the values of E contained in IM are relatively small in deeper water. The mean normalized error for $k_b$ is −59% and the standard deviation is 183%. This result suggests that even small errors in wave height can indicate a problem. Furthermore, the mean error is biased by the solution for water depths greater than 15 m, where bottom friction has minimal effect on the incident waves because the water close to the surface, where waves are generated, does not "see" the ocean floor. This problem demonstrates the limitations of using measured wave heights to infer bottom friction coefficients in deep water where wave heights are insensitive to bottom friction. The maximum wave-height error does not decrease below 0.02 m, which is an order of magnitude greater than for the previous runs. It is thus important to note that values of $E_{HO}$ greater than 1% are an indication of poor convergence of the inversion, and an accompanying uncertainty in the retrieved bottom friction field. Nevertheless, the recovered $k_b$ field (FIG. 10b) is reasonable for depths shallower than 15 m.

Cases 5 and 6: Introduction of Random Error

The tests discussed in this section use the same boundary condition as the previous cases and assume the same bathymetry; therefore, the Influence Matrix does not need to be recalculated. We will thus evaluate the impact of uncertainty in the measured wave field (Cases 5 and 6). In the next section we examine the inversion result for bottom friction when another key parameter may be poorly known; specifically, bathymetry (Cases 7 and 8).

Case 5 investigates the effect of uncertainty in the wave measurements by adding random noise to the control run wave field. When random noise with a standard deviation of 0.03 m (3% of wave height at the open boundary) was added to the wave heights from Case 2, the inversion terminated in 53 cycles with a maximum filtered wave-height error of less than 0.015 m, a mean error of −10% for $k_b$, and a standard deviation of 69%. It was also instructive to find at what level of uncertainty the inversion fails. The inversion stopped after 14 iterations when random noise with a standard deviation of 12% was added to the wave height field, i.e., Case 6 shown in Table 1. The value of E in IM is zero for column $n_e$ and the inversion stops because it cannot reduce the error at this point further via modification of the friction field. The mean and standard deviation of the $k_b$ error for the entire domain are −26% and 129%, respectively. These errors are larger than for Case 2, which has no noise in the wave field, but they remain less than for Case 4.

Cases 7 and 8: Bathymetry Uncertainty

It is important to examine the uniqueness of the inversion method with respect to uncertainty in nearshore bathymetry because water depth is a key parameter for the wave model. We do not need to recalculate IM because we are solving for $k_b$ and the bathymetry used in the inversion procedure is assumed to be the same as in Cases 1-6. The purpose of this test is to see if the uncertainty in water depth is erroneously retrieved by the inversion—i.e., whether the inversion will incorrectly identify a bathymetric feature as a low-friction area.

Figure 11A:
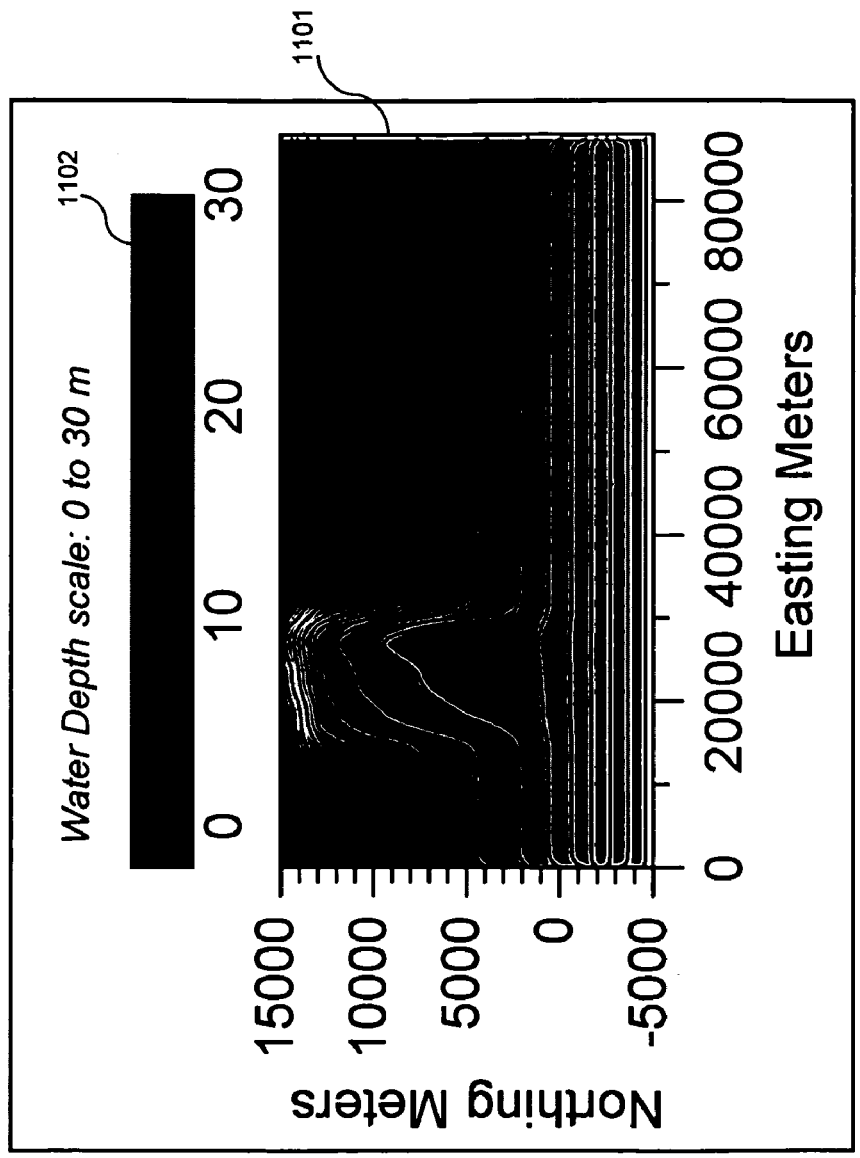
FIGS. 11A-11C depict plots of results from an additional exemplary application of the inversion method of the present invention after 31 analysis cycles.
Figure 11B:
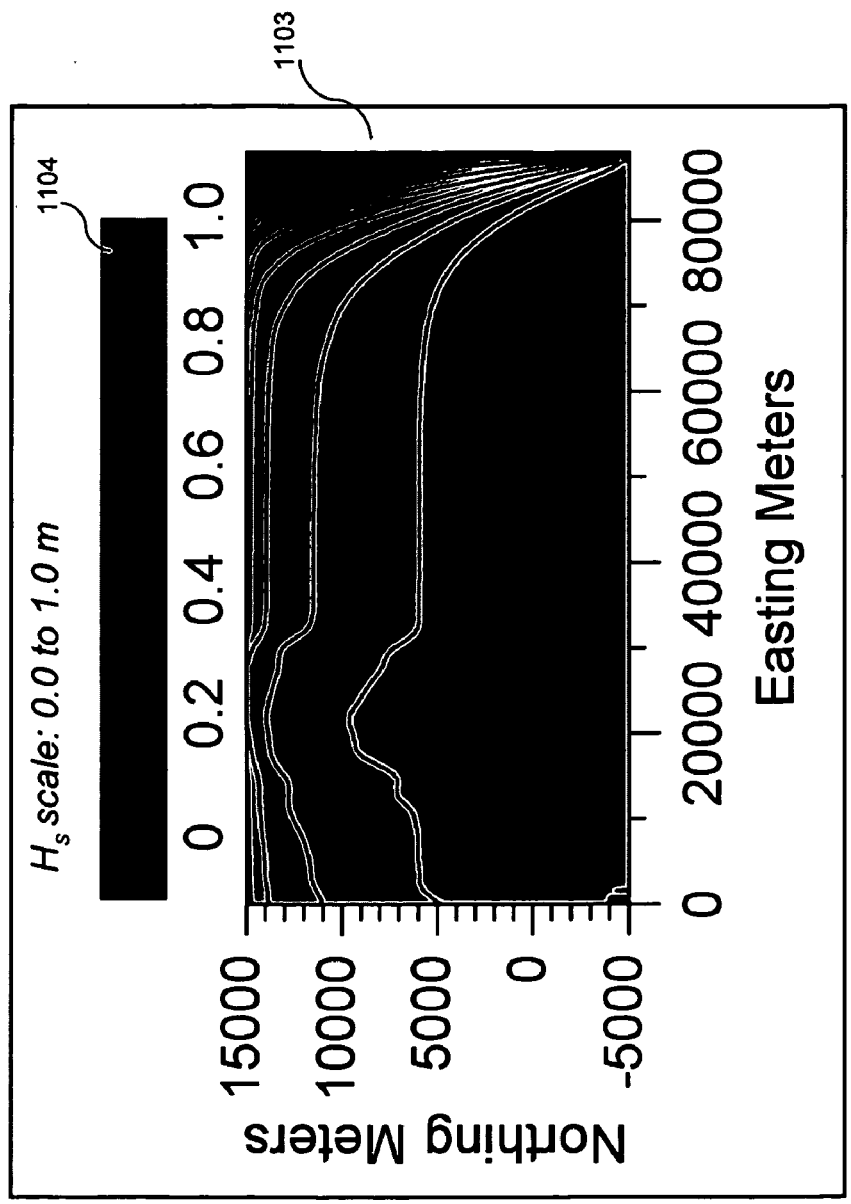

The grid for Case 7 has a uniform bottom roughness field ($k_b$=0.05 m) but incorporates an embayment with a mean depth of 5 m. A plot 1101, 1102 of wave heights for this configuration is shown in FIG. 11A. The inversion assumes that the depth of the depression is unknown. Such large bathymetry errors are unlikely but this problem will test the robustness of the inversion algorithm for large errors in more than one key parameter. As shown in FIG. 11B, the predicted wave heights 1103, 1104 over the feature are similar to those further offshore because the incident waves have propagated further before encountering shallow water where dissipation by bottom friction is substantial.

The inversion terminates after 343 cycles with an error of almost 0.02 m in $H_S$ because the maximum wave height error occurs at a location ($i_{oe}$, $j_{oe}$) that is not sensitive to changes in the friction field. Application of the Influence Matrix is, therefore, not possible because all values of IM for column $n_e$ are zero. The maximum error of 0.02 m suggests that the observed variation from the control wave field is not caused by bottom friction only, and thus the retrieved values of $k_b$ should be examined.

Figure 11C:
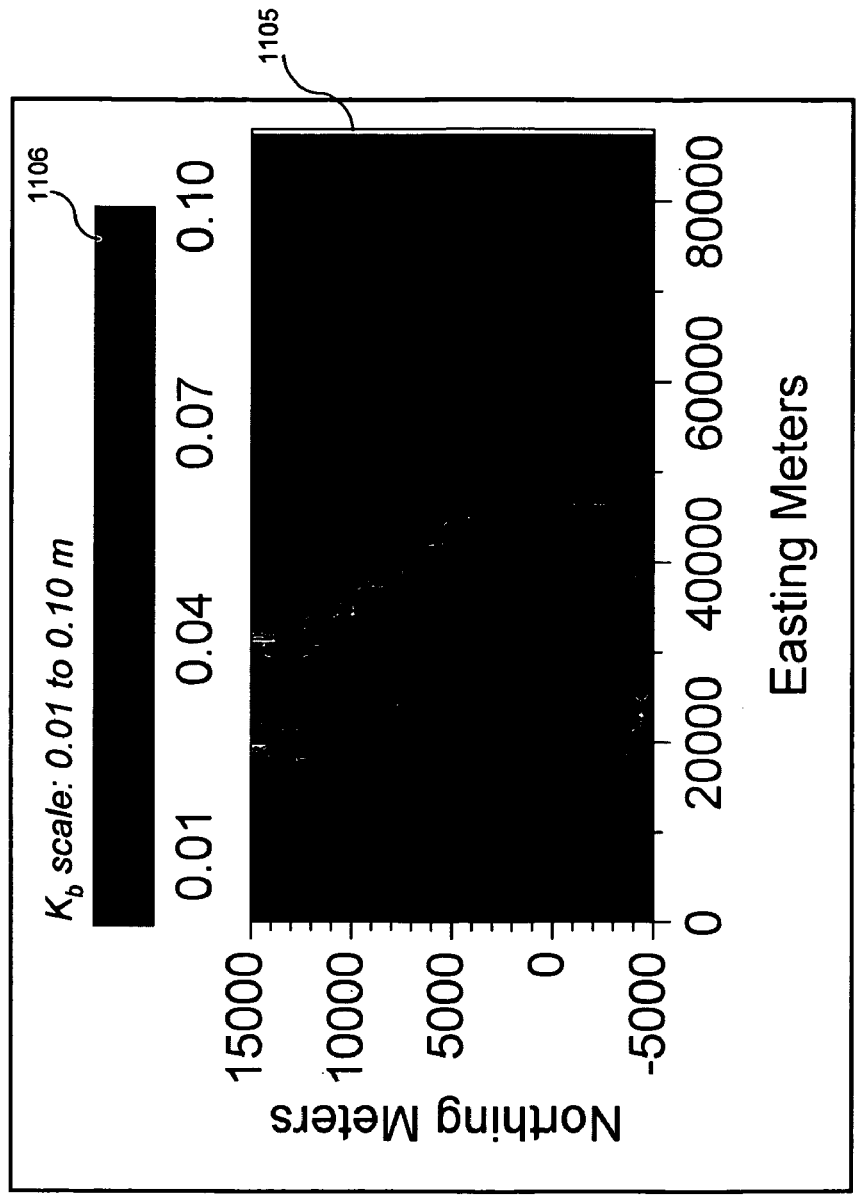

As with Case 3, the greatest modification of the background $k_b$ is in the shallowest water. In fact, the retrieved bottom roughness field shown in FIG. 11C mirrors the embayment, replacing water depth with smaller values of $k_b$. The errors increase as the coast is approached and a minimum $k_b$ of 0.005 is retrieved. This example demonstrates why a fundamental assumption of the inversion method of the present invention is that the bathymetry is known.

Figure 12A:
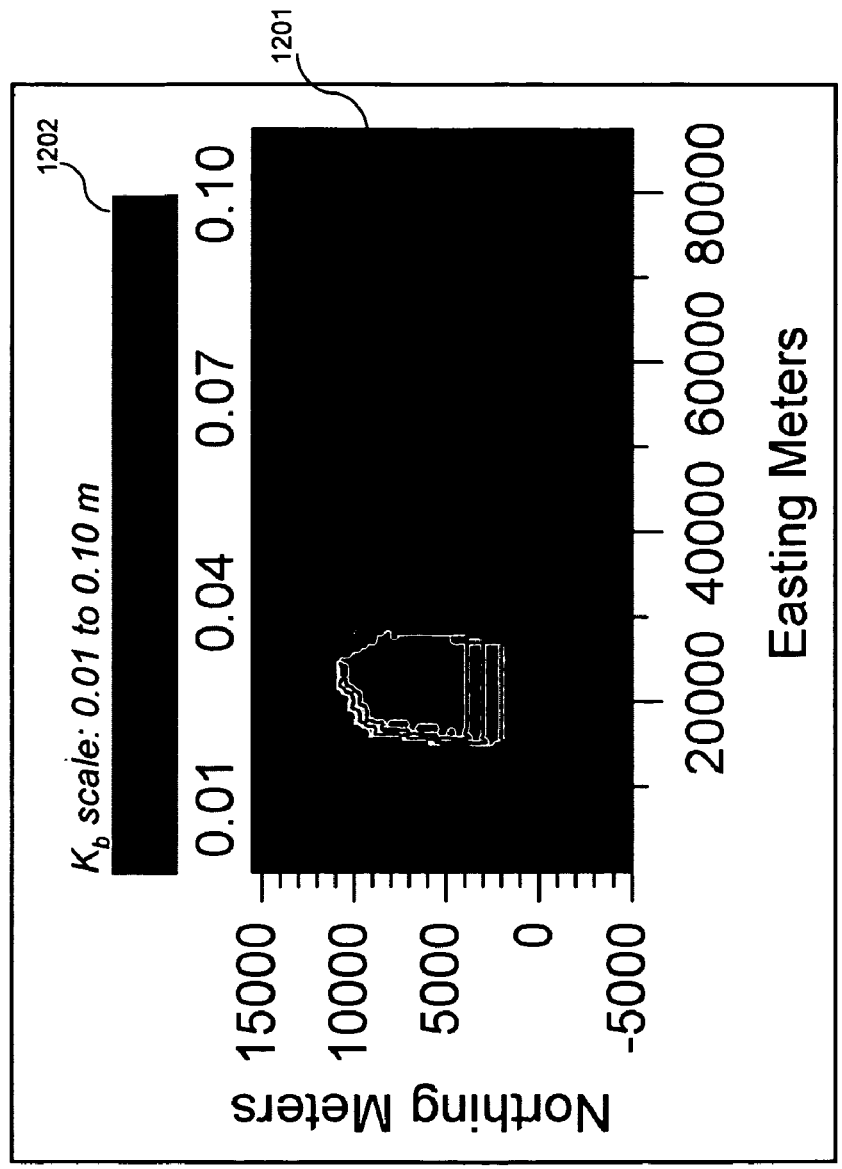
FIGS. 12A and 12B depict features used in a further additional exemplary application of the inversion method of the present invention.
Figure 12B:
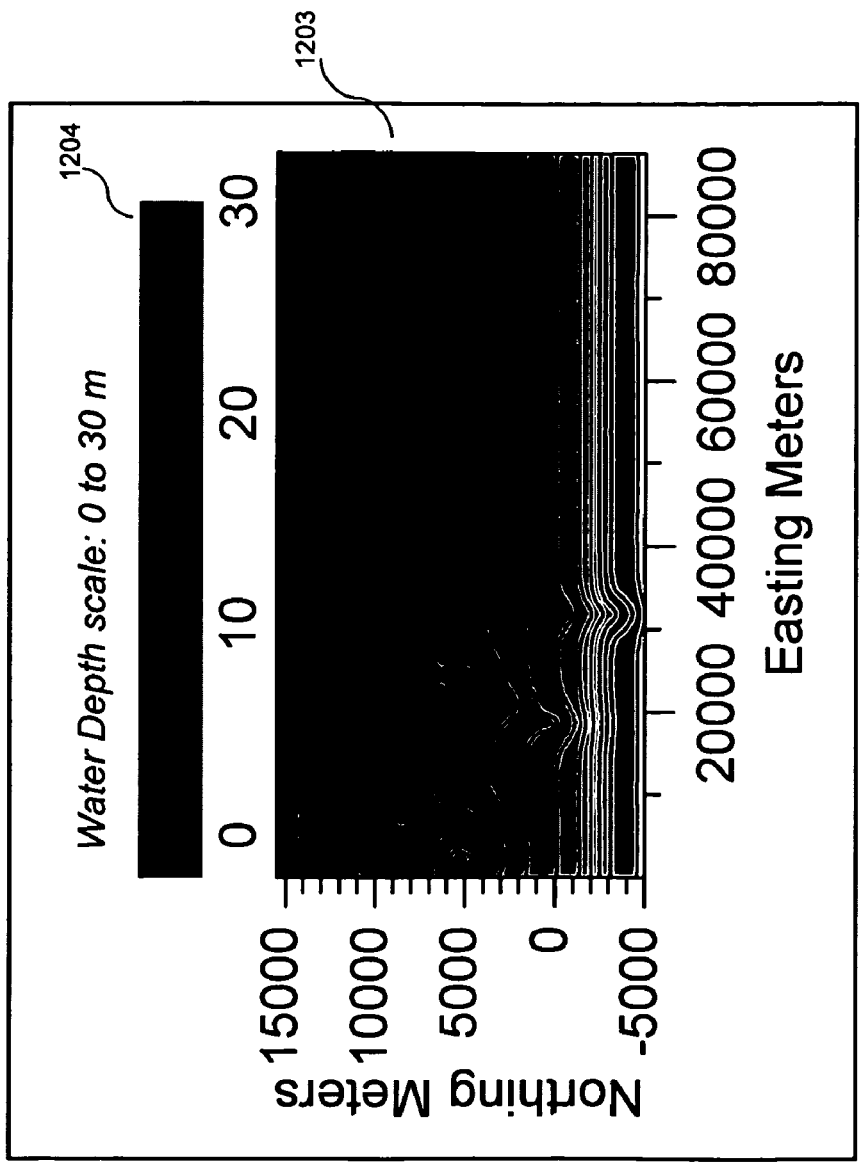
Figure 13A:
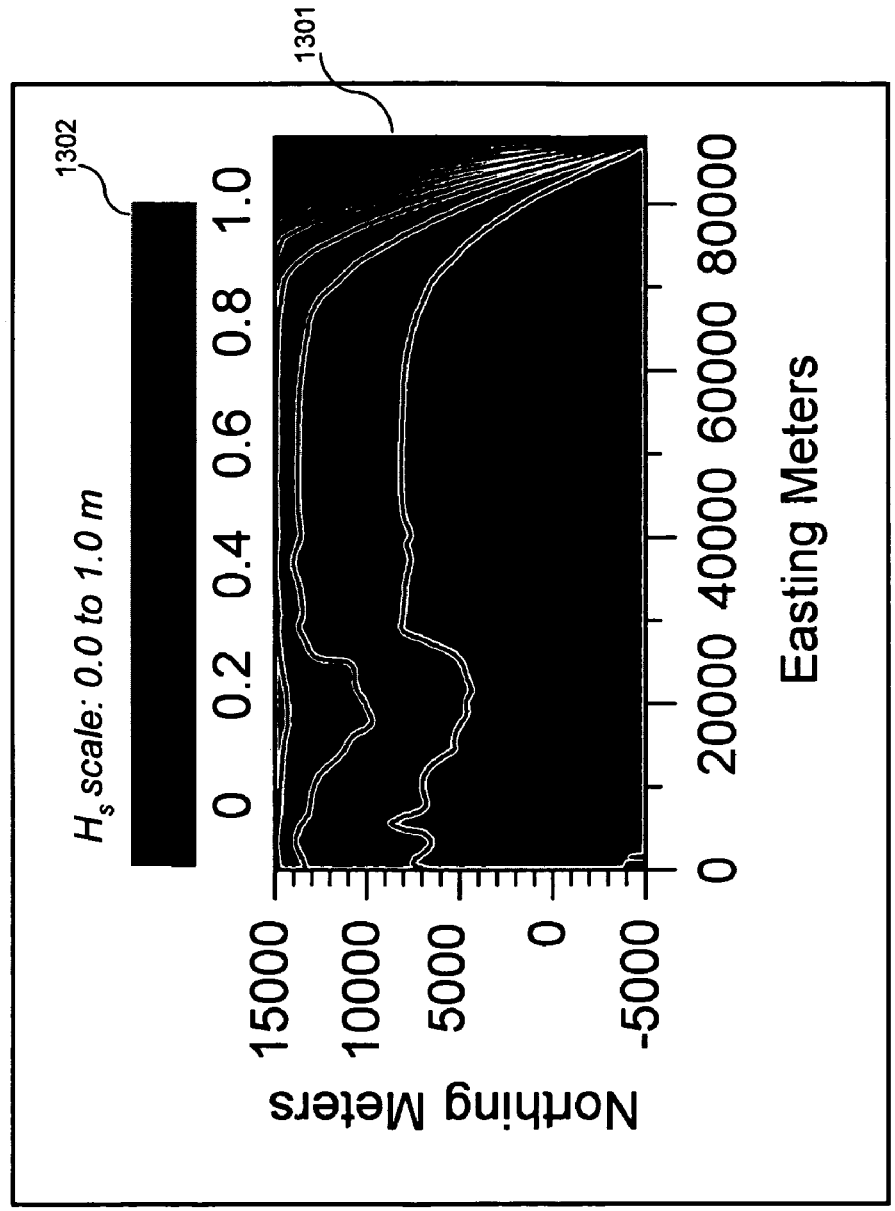
FIGS. 13A-13D depict plots of results from the further additional exemplary application of the inversion method of the present invention.

We can further examine the inversion's sensitivity to bathymetry errors with a more realistic example. Case 8 uses a high-friction feature with $k_b$=0.07 m superimposed on a uniform background roughness of 0.02 m. A plot 1201, 1202 of this $k_b$ field is shown in FIG. 12A. As shown in the plot 1203, 1204 in FIG. 12B, the bathymetry for Case 8 includes multiple shoals, with amplitudes of 0.5 to 2 m in water depths ranging from 8 to 28 m, superimposed on the smooth bathymetry used in cases 1 through 6. The same Influence Matrix is used as before because the inversion algorithm assumes that the bathymetry is the same and that variations in wave height are caused by bottom friction only. The wave field 1301, 1302 for the control run for Case 8, shown in FIG. 13A, has lower wave heights over the friction feature because of increased dissipation by bottom friction. The waves are higher, however, over the shoals because of shoaling effects. This can be seen by comparison of the bathymetry shown in FIG. 12B and the wave field shown in FIG. 13A along the western end of the grid at y=7000 m.

Figure 13B:
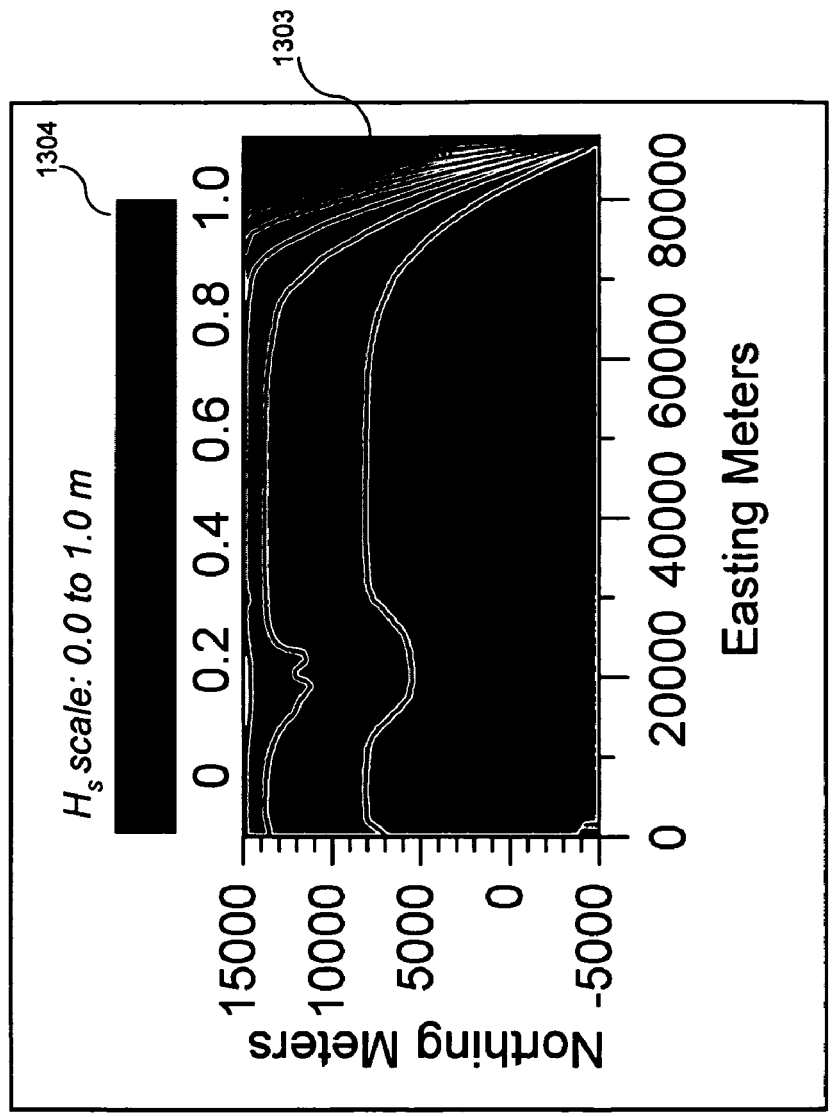
Figure 13C:
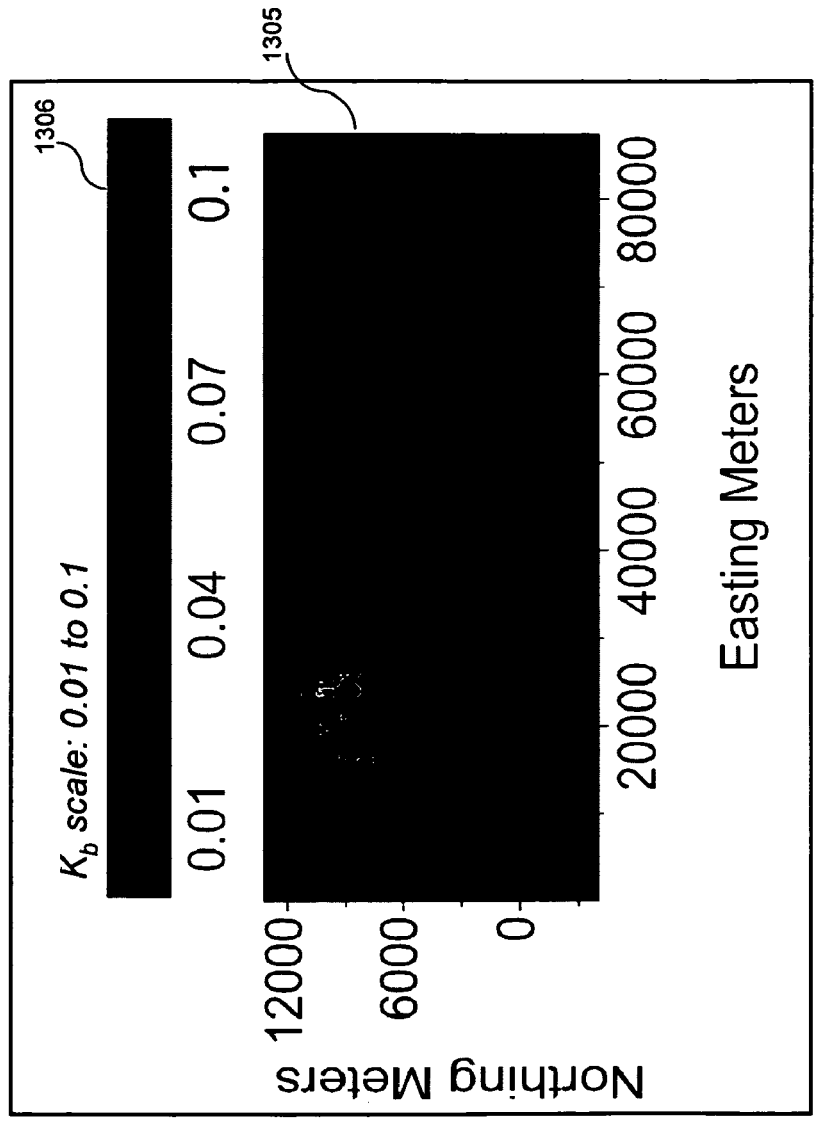

As shown in FIG. 13B, the predicted wave heights 1303, 1304 after 31 analysis cycles reflect the influence of the friction feature only, however, and not the shoals. As shown in the plot 1305, 1306 shown in FIG. 13C, the largest values of $E_{HO}$ occur in shallow water over the feature and not where the bathymetry errors are located. Based on our previous results, this large error suggests that the inversion is contaminated by another key parameter besides bottom friction.

Figure 13D:
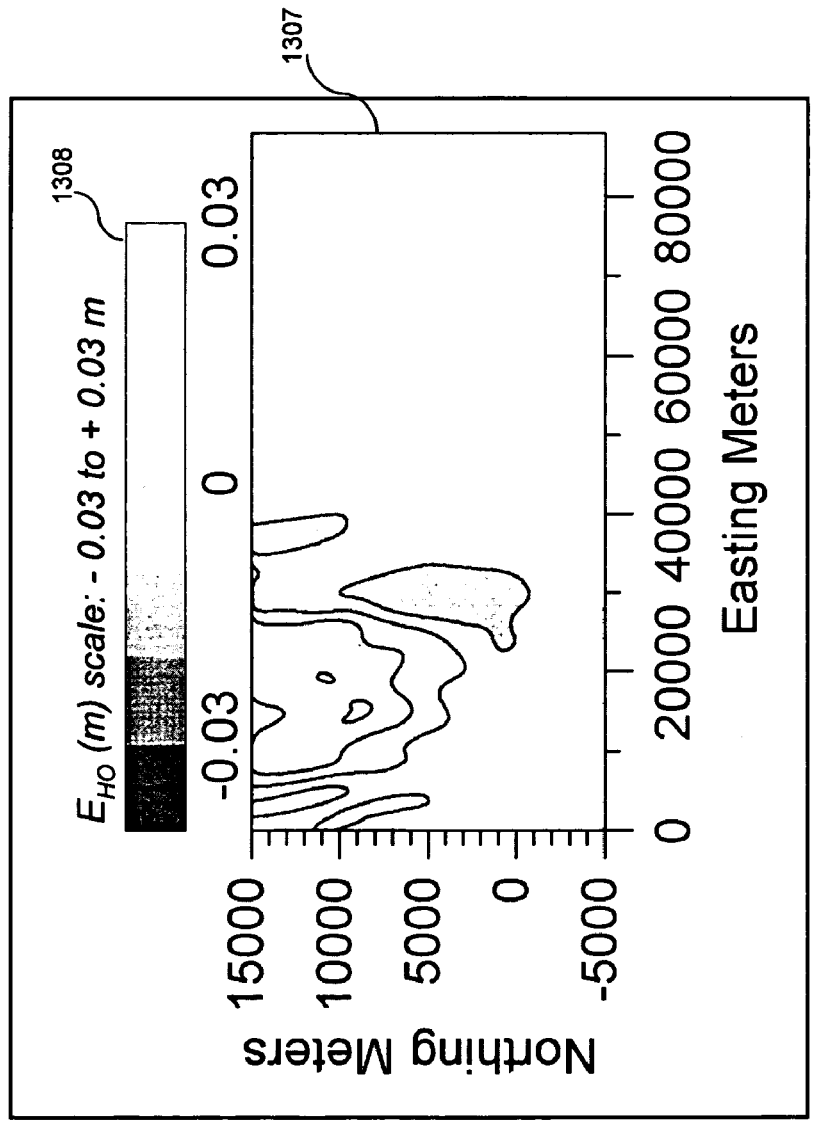

The mean and standard deviation for the $k_b$ errors are less than −1% and 15%, respectively, and comparing the retrieved bottom roughness field 1307, 1308 shown in FIG. 13D to the original field 1201, 1202 shown in FIG. 12A shows that the largest $k_b$ error occurs in shallow water and is not associated with the unknown shoals. This example demonstrates the importance of examining the distributions rather than relying on statistical parameters. Given this precaution, it appears that the inversion recovers the unknown friction feature reasonably well (low $k_b$ error) while indicating that there are other important features within the region that affect wave height (high $E_{HO}$). However, as suggested by case 4, whenever the wave height error is more than 1% it is necessary to examine the retrieved bottom roughness field to see if it is physically realistic.

Thus, the present invention provides a method for determining characteristics of a bottom friction field of a coastal floor. The methodology described herein can estimate such characteristics by inverting for heterogeneous sediment characteristics given a heterogeneous wave field, utilizing a numerical wave model and the physics of energy dissipation of waves as they travel across the friction field. The method accounts for the fact that the friction characteristics of the coastal floor have a non-local effect on wave energy, which is an important aspect of wave dynamics in coastal waters.

It should be noted that the inversion method of the present invention can be accomplished by executing one or more sequences of one or more computer-readable instructions read into a memory of one or more computers from volatile or non-volatile computer-readable media capable of storing and/or transferring computer programs or computer-readable instructions for execution by one or more computers. Volatile computer readable media that can be used can include a compact disk, hard disk, floppy disk, tape, magneto-optical disk, PROM (EPROM, EEPROM, flash EPROM), DRAM, SRAM, SDRAM, or any other magnetic medium; punch card, paper tape, or any other physical medium. Non-volatile media can include a memory such as a dynamic memory in a computer. In addition, computer readable media can be used to store and/or transmit instructions for carrying out methods described herein.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein.

What is claimed is:

1. A computer-implemented method for determining characteristics of an underwater bottom roughness field using a numerical wave model, comprising:

receiving data of a plurality of wave height measurements for an area of interest, the area of interest comprising a first grid divided into n cells along a first axis and m cells along a second axis normal to the first axis, each node in the first grid being designated by coordinates (i, j), each of the plurality of wave height measurements being associated with one node ($i_o$, $j_o$) in the first grid;

receiving data of a baseline bottom roughness parameter for the area of interest;

calculating, using a pre-selected computer, an Influence Matrix based on the baseline bottom roughness parameter;

executing, on the pre-selected computer, the numerical wave model selected using an estimated bottom roughness parameter to find a predicted wavefield, the predicted wavefield comprising a plurality of predicted waves having an associated predicted wave height at each node ($i_o$, $j_o$) in the first grid;

calculating, on the pre-selected computer, a difference between a measured wave height and a predicted wave height at each node ($i_o$, $j_o$) in the first grid to obtain a maximum wave height error, the maximum wave height error comprising a maximum difference between a predicted wave height and a measured wave height in the area of interest;

comparing, on the pre-selected computer, the maximum wave height error to a predetermined minimum tolerance level; and applying, on the pre-selected computer, the Influence Matrix to the estimated bottom roughness parameter to obtain a revised estimated bottom roughness parameter if the maximum wave height error is above the predetermined minimum tolerance level.

2. The method according to claim 1, further comprising:

determining a bottom roughness parameter at each node ($i_o$, $j_o$) in the first grid if the maximum wave height error is within the predetermined minimum tolerance level; and determining a bottom roughness field in the area of interest based on the bottom roughness parameter at each node ($i_o$, $j_o$) in the first grid.

3. The method according to claim 1, wherein the step of calculating the Influence Matrix IM comprises:

running the numerical wave model to obtain a baseline predicted wavefield for the baseline bottom roughness parameter;

running the numerical wave model to obtain a modified baseline predicted wavefield for a modified baseline bottom roughness parameter; and calculating a normalized wave height error at each node ($i_a$, $j_a$) of a second grid comprising a subset of the first grid to determine a value of each matrix element $E_{m,n}$ in the Influence Matrix IM.

4. The method according to claim 3, wherein the baseline predicted wavefield is calculated at each node ($i_o$, $j_o$) of the first grid and the modified baseline predicted wavefield is calculated at each node ($i_a$, $j_a$) of the second grid.

5. The method according to claim 1, wherein the Influence Matrix IM comprises:

$$\begin{bmatrix} E_{1,1} & E_{1,2} & E_{1,3} & \ldots & E_{1,no\times mo} \\ E_{2,1} & E_{2,2} & E_{2,3} & \ldots & E_{2,no\times mo} \\ E_{3,1} & E_{3,2} & E_{3,3} & \ldots & E_{3,no\times mo} \\ E_{na\times ma,1} & E_{na\times ma,2} & E_{na\times ma,3} & \ldots & E_{na\times ma,no\times mo} \end{bmatrix};$$

wherein no×mo equals the number of cells in the first grid and na×ma equals the number of cells in the second grid.

6. The method according to claim 5, wherein each matrix element $E_{m,n}$ is given by $$E_{m,n} = \frac{|H_{l,n} - H_{p,n}|}{E_{MAX}} n = 1, no \times mo;$$

wherein $H_{l,n}$ represents a baseline predicted wave height predicted by the numerical wave model for the baseline bottom roughness parameter at each node ($i_o$, $j_o$) of the first grid, $H_{p,n}$ represents a modified predicted wave height predicted by the numerical wave model for the modified bottom roughness parameter at each node ($i_a$, $j_a$) of the second grid, and $E_{MAX}$ represents the maximum error value.

7. A computer-implemented method for determining characteristics of an underwater bottom roughness field using a numerical wave model, comprising:
(a) receiving data of a plurality of wave height measurements for an area of interest, the area of interest comprising a grid divided into n cells along a first axis and m cells along a second axis normal to the first axis, each node in the grid being designated by coordinates (i, j), each of the plurality of wave height measurements being associated with one node ($i_o$, $j_o$) in the grid;
(b) receiving data of a baseline bottom roughness parameter for the area of interest;
(c) calculating, on a pre-selected computer, an Influence Matrix based on the baseline bottom roughness parameter;
(d) executing, on the pre-selected computer, the numerical wave model using an estimated bottom roughness parameter to find a predicted wavefield, the predicted wavefield comprising a plurality of predicted waves having an associated predicted wave height at each node ($i_o$, $j_o$) in the first grid;
(e) calculating, on the pre-selected computer, a difference between a measured wave height and a predicted wave height at each node ($i_o$, $j_o$) in the grid to obtain a maximum wave height error, the maximum wave height error comprising a maximum difference between a predicted wave height and a measured wave height in the area of interest;
(f) comparing, on the pre-selected computer, the maximum wave height error to a predetermined minimum tolerance level;
(g) applying, on the pre-selected computer, the Influence Matrix to the estimated bottom roughness parameter to obtain a revised estimated bottom roughness parameter if the maximum wave height error is above the predetermined minimum tolerance level; and
(h) repeating steps (d) through (g) until the maximum wave height error is below the predetermined minimum tolerance level.

8. The method according to claim 7, further comprising:
(i) determining a retrieved bottom roughness parameter at each node ($i_o$, $j_o$) in the grid when the maximum wave height error is within the predetermined tolerance level; and
(j) determining a bottom roughness field in the area of interest based on the bottom roughness parameter at each node ($i_o$, $j_o$) in the grid.

9. A method of estimating an influence of a change in bottom roughness on a wavefield at a surface, comprising:
receiving data of a first grid associated with the wavefield, the first grid comprising no cells along a first axis and mo cells along a second axis normal to the first axis for a total of no×mo cells, each node in the grid being designated by coordinates ($i_o$, $j_o$);
receiving data of a second grid associated with the wavefield, the second grid comprising na cells along the first axis and ma cells along the second axis for a total of na×ma cells, each node in the second grid being designated by coordinates ($i_a$, $j_a$);
executing, on a pre-selected computer, a numerical wave model to obtain a baseline predicted wavefield for a baseline bottom roughness parameter;
executing, on the pre-selected computer, the numerical wave model to obtain a modified predicted wavefield for a modified bottom roughness parameter; and
calculating, on the pre-selected computer, a normalized wave height error $E_{m,n}$ at each node ($i_a$, $j_a$) of the second grid, the normalized wave height error representing an influence of the modified bottom roughness field on the modified predicted wavefield at each node ($i_a j_a$) of the second grid.

10. The method according to claim 9, wherein the normalized wave height error $E_{m,n}$ is given by the equation $$E_{m,n} = \frac{|H_{l,n} - H_{p,n}|}{E_{MAX}} n = 1, no \times mo;$$

wherein $H_{l,n}$ represents a baseline predicted wave height predicted by the numerical wave model for the baseline bottom roughness parameter at each node ($i_o$, $j_o$) of the first grid, $H_{p,n}$ represents a modified predicted wave height predicted by the numerical wave model for the modified bottom roughness parameter at each node ($i_a j_a$) of the second grid, and $E_{MAX}$ represents the maximum error value.

11. The method according to claim 10, further comprising repeating the calculation of $E_{m,n}$ a total of m times, wherein m=1, na×ma.

12. The method according to claim 10, wherein the values of $E_{m,n}$ comprise elements of an influence matrix IM.

13. The method according to claim 12, wherein the influence matrix IM comprises:

$$\begin{bmatrix} E_{1,1} & E_{1,2} & E_{1,3} & \ldots & E_{1,no \times mo} \\ E_{2,1} & E_{2,2} & E_{2,3} & \ldots & E_{2,no \times mo} \\ E_{3,1} & E_{3,2} & E_{3,3} & \ldots & E_{3,no \times mo} \\ E_{na \times ma,1} & E_{na \times ma,2} & E_{na \times ma,3} & \ldots & E_{na \times ma, no \times mo} \end{bmatrix};$$

wherein no×mo equals the number of cells in the first grid and na×ma equals the number of cells in the second grid.

14. A computer-implemented method for determining characteristics of an underwater bottom roughness field using a numerical wave model, comprising:
receiving data of a plurality of wave characteristic measurements for an area of interest, the area of interest comprising a grid divided into no cells along a first axis and mo cells along a second axis normal to the first axis for a total of no×mo cells in the first grid, each node in the grid being designated by coordinates (i, j), each of the plurality of wave characteristic measurements being associated with one node ($i_o$, $j_o$) in the grid;
receiving data of a baseline bottom roughness parameter for the area of interest;
calculating, on a pre-selected computer, an Influence Matrix based on the baseline bottom roughness parameter;
executing, on the pre-selected computer, the numerical wave model using an estimated bottom roughness parameter to find a predicted wavefield, the predicted wavefield comprising a plurality of predicted waves having an associated predicted wave characteristic at each node ($i_o$, $j_o$) in the grid;
calculating, on the pre-selected computer, a difference between a measured wave characteristic and a predicted wave characteristic at each node ($i_o$, $j_o$) in the grid to obtain a maximum wave characteristic error, the maximum wave characteristic error comprising a maximum difference between a predicted wave characteristic and a measured wave characteristic in the area of interest;

comparing, on the pre-selected computer, the maximum wave characteristic error to a predetermined minimum tolerance level; and applying, on the pre-selected computer, the Influence Matrix to the estimated bottom roughness parameter to obtain a revised estimated bottom roughness parameter if the maximum wave characteristic error is above the predetermined minimum tolerance level.

15. The method according to claim 14, wherein the wave characteristic is wave height.

16. The method according to claim 14, further comprising:
determining a bottom roughness parameter at each node $(i_o, j_o)$ in the grid if the maximum wave characteristic error is within the predetermined minimum tolerance level; and determining a bottom roughness field in the area of interest based on the bottom roughness parameter at each node $(i_o, j_o)$ in the grid.

17. A computer program product including a computer storage medium comprising one of volatile media and non-volatile media and a computer program code mechanism embedded in the computer storage medium for determining characteristics of an underwater bottom roughness field, comprising:

a computer code module configured to receive data of a plurality of wave characteristic measurements for an area of interest, the area of interest comprising a grid divided into n cells along a first axis and m cells along a second axis normal to the first axis, each node in the first grid being designated by coordinates $(i, j)$, each of the plurality of wave characteristic measurements being associated with one node $(i_o, j_o)$ in the grid;

a computer code module configured to receive data of a baseline bottom roughness parameter for the area of interest;

a computer code module configured to calculate, on a pre-selected computer, an Influence Matrix based on the baseline bottom roughness parameter;

a computer code module configured to execute, on the pre-selected computer, a numerical wave model using an estimated bottom roughness parameter to find a predicted wavefield, the predicted wavefield comprising a plurality of predicted waves having an associated predicted wave characteristic at each node $(i_o, j_o)$ in the grid;

a computer code module configured to calculate, on the pre-selected computer, a difference between a measured wave characteristic and a predicted wave characteristic at each node $(i_o, j_o)$ in the grid to obtain a maximum wave characteristic error, the maximum wave characteristic error comprising a maximum difference between a predicted wave characteristic and a measured wave characteristic in the area of interest;

a computer code module configured to compare, on the pre-selected computer, the maximum wave characteristic error to a predetermined minimum tolerance level;

a computer code module configured to apply, on the pre-selected computer, the Influence Matrix to the estimated bottom roughness parameter to obtain a revised estimated bottom roughness parameter if the maximum wave characteristic error is above the predetermined minimum tolerance level;

a computer code module configured to retrieve a bottom roughness parameter at each node $(i_o, j_o)$ in the grid if maximum wave characteristic error is within the predetermined minimum tolerance level; and a computer code module configured to determine a bottom roughness field in the area of interest based on the bottom roughness parameter at each node $(i_o, j_o)$ in the grid;

wherein characteristics of the bottom roughness field in the area of interest are recovered.

18. The method according to claim 17, wherein the wave characteristic is wave height.

* * * * *